(12) United States Patent
Linder et al.

(10) Patent No.: US 8,710,109 B2
(45) Date of Patent: Apr. 29, 2014

(54) CHEMICALLY RESISTANT MEMBRANES, COATINGS AND FILMS AND METHODS FOR THEIR PREPARATION

(75) Inventors: Charles Linder, Rehovot (IL); Ora Kedem, Haifa (IL); Yoram Oren, Beer-Sheva (IL)

(73) Assignee: Ben Gurion University of the Negev Research and Development Authority, Beer Sheva (IL)

( * ) Notice: Subject to any disclaimer, the term of this patent is extended or adjusted under 35 U.S.C. 154(b) by 166 days.

(21) Appl. No.: 13/202,303

(22) PCT Filed: Feb. 21, 2010

(86) PCT No.: PCT/IL2010/000148
§ 371 (c)(1),
(2), (4) Date: Nov. 14, 2011

(87) PCT Pub. No.: WO2010/095139
PCT Pub. Date: Aug. 26, 2010

(65) Prior Publication Data
US 2013/0203873 A1    Aug. 8, 2013

Related U.S. Application Data

(60) Provisional application No. 61/202,328, filed on Feb. 19, 2009.

(51) Int. Cl.
*B01J 49/00* (2006.01)
*C08F 8/30* (2006.01)

(52) U.S. Cl.
USPC ....... 521/27; 525/351; 525/326.2; 525/326.4; 525/359.1

(58) Field of Classification Search
USPC ............ 521/27; 525/351, 326.2, 326.4, 359.1
See application file for complete search history.

(56) References Cited

U.S. PATENT DOCUMENTS

| | | |
|---|---|---|
| 3,402,144 A | 9/1968 | Hay |
| 3,516,791 A | 6/1970 | Evans |
| 3,556,305 A | 1/1971 | Shorr |
| 3,567,810 A | 3/1971 | Baker |
| 3,615,024 A | 10/1971 | Michaels |
| 3,639,337 A | 2/1972 | Klebe |
| 3,812,224 A | 5/1974 | Smith |
| 3,840,646 A | 10/1974 | Sugimoto |
| 3,989,981 A | 11/1976 | Ogle |
| 4,029,582 A | 6/1977 | Ishii |
| 4,188,354 A | 2/1980 | Bottino |
| 4,247,498 A | 1/1981 | Castro |
| 4,256,596 A | 3/1981 | Cohen |
| 4,273,903 A | 6/1981 | Rose |
| 4,413,106 A | 11/1983 | Coplan |
| 4,466,931 A | 8/1984 | Tanny |
| 4,504,852 A | 3/1985 | Ducret |
| 4,508,832 A | 4/1985 | Carter |
| 4,508,852 A | 4/1985 | Bikson |
| 4,598,137 A | 7/1986 | Guiver |
| 4,657,990 A | 4/1987 | Daoust |
| 4,690,765 A | 9/1987 | Linder |
| 4,781,733 A | 11/1988 | Babcock |
| 4,797,187 A | 1/1989 | Davis |
| 4,797,457 A | 1/1989 | Guiver |
| 4,839,203 A | 6/1989 | Davis |
| 4,889,636 A | 12/1989 | Perry |
| 4,894,159 A | 1/1990 | Guiver |
| 4,990,252 A | 2/1991 | Tomaschke |
| 5,013,765 A | 5/1991 | Sluma |
| 5,028,337 A | 7/1991 | Linder |
| 5,032,282 A | 7/1991 | Linder |
| 5,039,421 A | 8/1991 | Linder |
| 5,068,070 A | 11/1991 | Gunji |
| 5,071,448 A | 12/1991 | Bikson |
| 5,128,378 A | 7/1992 | Sugaya |
| 5,173,542 A | 12/1992 | Lau |
| 5,227,457 A | 7/1993 | Marrocco, III |
| 5,348,569 A | 9/1994 | Bikson |
| 5,364,454 A | 11/1994 | Bikson |
| 5,438,082 A | 8/1995 | Helmer-Metzmann |
| 5,625,010 A | 4/1997 | Gagne |
| 5,670,564 A | 9/1997 | Gagne |
| 5,766,528 A | 6/1998 | Su |
| 5,886,130 A | 3/1999 | Trimmer |

(Continued)

FOREIGN PATENT DOCUMENTS

| | | |
|---|---|---|
| DE | 102004063215 B1 | 2/2007 |
| EP | 0152161 B1 | 8/1985 |
| EP | 0489693 | 6/1992 |
| GB | 2000720 | 1/1979 |
| IL | 120635 | 8/1997 |
| JP | 2000072965 | 3/2000 |
| JP | 2000309707 | 11/2000 |
| WO | 99/40996 | 8/1999 |
| WO | 2007/135689 A1 | 11/2007 |
| WO | WO 2007135689 A2 * | 11/2007 |

OTHER PUBLICATIONS

Alberti, G. and Casciola, M. (1997) Layered metal IV phosphonates, a large class of inorgano-organic proton conductors. Solid State Ionics 97(1-4):177-186.

(Continued)

*Primary Examiner* — Michael Bernshteyn
(74) *Attorney, Agent, or Firm* — Rodney J. Fuller; Booth Udall Fuller, PLC

(57) ABSTRACT

There is provided herein a membrane or film comprising one or more aromatic ionomers covalently crosslinked through aryl-aryl (—Ar—Ar—), aryl-ether-aryl (—Ar—O—Ar—), aryl-sulfide-aryl (—Ar—S—Ar—), aryl-sulfone-aryl bonds, or any combination thereof, wherein said one or more aromatic ionomers further comprises at least one electron withdrawing group adapted to improve oxidant resistance of said membrane or film.

20 Claims, No Drawings

(56) References Cited

U.S. PATENT DOCUMENTS

| | | | |
|---|---|---|---|
| 5,922,203 | A | 7/1999 | Tomaschke |
| 6,090,895 | A | 7/2000 | Mao |
| 6,103,414 | A | 8/2000 | Cabasso |
| 6,509,441 | B1 * | 1/2003 | Kerres ............................ 528/391 |
| 6,632,847 | B1 | 10/2003 | Soczka-Guth et al. |
| 8,455,557 | B2 * | 6/2013 | Linder et al. ..................... 521/27 |
| 2002/0045085 | A1 | 4/2002 | Formato |
| 2004/0242807 | A1 | 12/2004 | Weber |
| 2005/0031925 | A1 | 2/2005 | Ofer |
| 2005/0031928 | A1 | 2/2005 | Ishizone |
| 2005/0238937 | A1 | 10/2005 | Oren |
| 2005/0261459 | A1 | 11/2005 | Marrocco, III |
| 2006/0008697 | A1 | 1/2006 | Kim |
| 2006/0036064 | A1 | 2/2006 | McGrath |
| 2006/0047095 | A1 | 3/2006 | Pacetti |
| 2007/0163951 | A1 | 7/2007 | McGrath |

OTHER PUBLICATIONS

Fritsch, Detlev et al., (2002) Syntheses of branched poly(ether Ketones)s with pendant functional groups based on 1,1,1-tris(4-hydroxyphenyl)ethane. J of Macromolecular science A 39(11):1335-1347.

Kim, Young H. and Webster, Owen W. (1992) Hyperbranched Polyphenylenes. Macromolecules 25(21):5561-5572.

Kopitzke, R. W. (1998) Sulfonation of a poly(phenylquinoxaline) film. Journal of Polymer Science Part A: Polymer Chemistry 36(7):1197-1199 Epub Jan. 21, 2000.

Kovacic, Peter and Jones, Martin B. (1987) Dehydro coupling of aromatic nuclei by catalyst-oxidant systems: poly (p-phenylene). Chem. Rev. 87(2):357-379.

Kricheldorf, Hans R. et al., (2002) Synthesis and functionalization of polyethersulfones based on 1,1,1 tris (4-hydroxyphenyl) ethane. J polymer Science A: Polymer Chemistry 40(17):2967-2978 Epub Jul. 11, 2002.

Litter, Marta I. and Marvel, C. S. (1985) Polyaromatic ether-ketones and polyaromatic ether-ketone sulfonamides from 4-phenoxybenzoyl chloride and from 4,4' -dichloroformyldiphenyl ether. Journal of Polymer Science: Polymer Chemistry Edition 23(8):2205-2223.

Yang, Yunsong et al., (2004) Synthesis of poly[arylene ether sulfone-b-vinylidene fluoride] block copolymers. European polymer journal 40(3):531-541.

Yang, Yunsong et al., (2004) Synthesis of Sulfonated Polysulfone-block-PVDF Copolymers: Enhancement of Proton Conductivity in Low Ion Exchange Capacity Membranes. Macromolecules 37(5):1678-1681.

Uchimoto, Yoshiharu et al., (1990) Ionically conductive thin polymer films prepared by plasma polymerization. Part 7. Preparation and characterization of solid polymer electrolyte having fixed carboxylic acid groups with single mobile species. Solid State Ionics 40-41(2):624-627.

Bierenbaum, Harvey S. et al., (1974) Microporous Polymeric Films. Ind. Eng. Chem. Prod. Res. Dev.13(1):2-9.

Daly, William H. et al., (1988) Modification of Condensation Polymers Challenges and Opportunities. ACS Symposium Series 364 chapter 1:4-23.

Lee, Angela Lisandra S. et al., (2011) Novel glycerol cross-linked poly(acrylic acid) hydrogel for encapsulation and release of benzocaine. Philippino Science Letters 4(2):81-87.

Linder, Charles and Kedem, Ora (2001) Asymmetric ion exchange mosaic membranes with unique selectivity. Journal of Membrane Science 181(1):39-56.

Saito, Kei et al., (2004) Oxidative polymerization of 2,6 dimethylphenol to form Poly(2,6 dimethyl-1,4-phenylene oxide) in Water. Angew Chem Int Ed Engl 43(6):730-733.

Xu, Jing-Kun et al., (2002) Doping level increase of poly(3-methylthiophene) film during electrochemical polymerization process. Chinese Journal of Polymer Science 20(5):425-430.

ISR of PCT/IL2007/000634 mailed Oct. 1, 2009.

ISR of PCT/IL2010/000148 mailed May 21, 2010.

EP 07736374.5 Supplementary European Search Report Mar. 18, 2011.

U.S. Appl. No. 12/227,634 Non-Final rejection Jun. 29, 2012.

* cited by examiner

CHEMICALLY RESISTANT MEMBRANES, COATINGS AND FILMS AND METHODS FOR THEIR PREPARATION

This application is a national stage entry under 35 U.S.C. §371 and claims priority from PCT application PCT/IL2010/000148 filed Feb. 21, 2010, which claims priority from U.S. Provisional Application Serial No. 61/202,328, filed Feb. 19, 2009.

FIELD OF THE INVENTION

The present disclosure generally relates to the field of membranes. More specifically, the present disclosure relates to covalent crosslinked selective barriers as composite and/or film membranes and methods for the preparation thereof.

BACKGROUND

Various membrane processes may generally be applied for example, in water treatment and industrial treatment applications. The cost effectiveness of these processes depends, among other factors, on the combination of the membrane properties, such as flux, separation characteristics, performance stability, and fouling resistance as well as the ability to be cleaned when fouled.

For many applications properties such as chemical resistance, high oxidant or aqueous halogen solution (hypochlorite) resistance, as well as flux and rejection, are considerably important. However, it appears that this combination of properties is difficult to achieve. For water treatment and desalination applications, for example, to-date commonly used membranes are reverse osmosis (RO) and/or nanofiltration (NF) membranes based on polyamide composites. These membranes may generally be considered to have good flux and rejection characteristics, but from the stability and chemical resistance point of view, there is still a need for improvement. Other RO and NF membranes, such as polyvinyl alcohol and sulfonated engineering plastics membranes, may generally be considered to have better chemical resistance but suffer from inferior flux/selectivity characteristics compared to the polyamide composites membranes. In addition, they do not have high oxidant resistance or specific resistance to widely used hypochlorite disinfectants. Therefore, the development and manufacture of membranes, such as RO and NF membranes, having the flux/selectivity/rejection properties similar to (or better than) that of the polyamide membranes, but with higher chemical resistance, particularly oxidant and/or halogenation resistance which occurs on exposure to aqueous halogen solution (hypochlorite), is of great importance and may significantly lower the cost of water treatment.

Membranes, such as RO membranes, with higher salt rejections are also highly important, for example, for seawater desalination. In desalination of water streams, especially seawater and brackish water, high rejections without loss of flux would decrease the cost of the final water product. In addition, there are many applications in water purifications where one would like to remove boron or nitrates. Existing membranes, such as RO and NF membranes, still do not have sufficiently high and long-term rejections to these components, and any membrane or modification that can improve the rejection of RO and NF membranes to these solutes is of great importance.

There are ionic polymers, such as polyelectrolytes and ionomer materials, which offer good potential for making membranes, for example, highly stable selective RO and NF membranes, if they can be prepared in a given morphology and fixed into this morphology by covalent crosslinking. In general, the problem with non-crosslinked thin selective layers, especially for RO and NF membranes based on ionomers and polyelectrolytes, is the continuous swelling and change in performance over time and/or changes in the ionic strength of the solution. However, chemically stable covalent crosslinking in chemically stable ionomer materials is difficult to achieve, especially when improved oxidant and halogenation resistance is desirable.

Patent application WO2007135689 discloses membranes and/or films (for example, from a polymer or blend(s) of polymers) having a given morphology which is stabilized, for example against swelling and chemical degradation, by covalent crosslinking and optionally, in addition, by hydrophobization. The membrane made above was placed in the following solutions to check stability: pH 11-12 for 14 days at room temperature, pH 1-2 for 14 days at room temperature and 20-30 ppm NaOCl pH 10 for 14 days at room-temperature. In all solutions the membrane performance remained stable.

U.S. Pat. No. 4,990,252 discloses a novel thin film composite or coated membrane suitable for reverse osmosis, ultrafiltration and microfiltration applications, and having a porous polymeric substrate with one or more microporous layers to which a thin film or coating comprising a sulfonated polyarylether is attached substantively to provide an oxidatively stable, thin hydrophilic film or coating layer, and a method for manufacturing and using the same. Some of the examples included the examination of porous polysulfone substrate coated with a solution of sulfonated polyethersulfone.

Patent application US 20070163951 discloses a method of making a chlorine tolerant hydrophilic-hydrophobic copolymer desalination membrane. The membrane is made by forming a hydrophilic-hydrophobic random copolymer having one or more hydrophilic monomers and one or more hydrophobic monomers and forming the hydrophilic-hydrophobic random copolymer into a hydrophilic-hydrophobic copolymer desalination membrane. The hydrophilic monomers include a sulfonated polyarylsulfone monomer and a second monomer, while the hydrophobic monomers include a non-sulfonated third monomer and a fourth monomer. The sulfonated polyarylsulfone monomer introduces the sulfonate into the hydrophilic-hydrophobic random copolymer and provides a chlorine tolerant hydrophilic-hydrophobic copolymer desalination membrane.

Based on the similarities in chemical compositions as described in Patent application WO2007135689 and U.S. Pat. No. 4,990,252 these membranes are not expect to maintain their flux under the conditions 500-1000 ppm NaOCl pH 9 and 20° C.

Patent application US 20020045085 discloses composite solid polymer electrolyte membranes (SPEMs) which include a porous polymer substrate interpenetrated with an ion-conducting material. The stability of the ion-conducting polymer may be enhanced by several post-processing steps, including chlorination/bromination of the ion-conducting polymer backbone, thereby reducing degradation sites.

The post treatment is not a practical approach for many membranes and coatings. In addition, when the post halogenation step is carried out as described in the above application, it is difficult to control the balance between the crosslinking and hydrophobicity/hydrophilicity, which is required in order to achieve stability, good flux and selectivity properties.

Thus, there is an unmet need in the art for resistant membranes characterized by stable covalent crosslinks, with high resistance to oxidants and halogenation reactions occurring, for example, in aqueous halogen solution (hypochlorite), that also maintain good flux/rejection/selectivity properties.

SUMMARY

The present disclosure generally relates to the field of membranes, films and coatings. More specifically, the present disclosure relates to covalently crosslinked selective barriers as membranes (such as composite membranes) and/or films and/or coatings, which are characterized, according to some embodiments, by high chemical resistance, particularly high oxidant resistance, for example resistance in aqueous halogen solution (hypochlorite).

According to some embodiments, functional groups such as halides, nitro and various ionic groups (for example sulfonic, phosphonic and carboxylic groups) on aromatic groups are used to stabilize or enhance the resistance of aromatic polymers in membranes, for example, against oxidative attack.

In effect, one or more aromatic polymers, such as aromatic condensation polymers, with a combination of functional groups such as ionic groups (e.g., sulfonic phosphonic, carboxylic, cationic groups, such as, quaternary ammoniums), reactive groups such as, primary amino, hydroxyl and sulfide groups, and oxidant stabilizing groups such as halides, nitro, and sulfonic on the same or different polymers, may be used to prepare the membranes/films according to some embodiments of the present invention. The primary amino groups are generally used for crosslinking through diazonium reactions, and the halides and nitro groups, present on the aromatic polymeric backbone, are adapted to minimize attack by oxidants. According to some embodiments, the fraction of aromatic groups of the ionomer with the electron withdrawing groups (e.g., halides, nitro and sulfonic), should be optimized to achieve good stability with flux and rejection.

According to some embodiments, there is provided herein a membrane or film comprising one or more aromatic ionomers covalently crosslinked through aryl-aryl (—Ar—Ar—), aryl-ether-aryl (—Ar—O—Ar—), aryl-sulfide-aryl (—Ar—S—Ar—), aryl-sulfone-aryl bonds, or any combination thereof, wherein said one or more aromatic ionomers further comprises at least one electron withdrawing group adapted to improve oxidant resistance of said membrane or film. According to some embodiments the electron withdrawing group(s) may be on a fraction of the aromatic groups of the aromatic ionomers.

According to some embodiments, the covalent crosslinking of this discloser may be formed through diazonium reactions of primary amine groups present on aromatic moieties of the one or more aromatic ionomers prior to crosslinking. The primary amino groups typically readily undergo the required diazonium reactions.

According to further embodiments, there is provided herein a process for the preparation of a membrane or film, the process includes covalently crosslinking one or more aromatic ionomers to form aryl-aryl (—Ar—Ar), aryl-ether-aryl (—Ar—O—Ar—), aryl-sulfide-aryl (—Ar—S—Ar—), aryl-sulfone-aryl bonds or any combination thereof, wherein the one or more aromatic ionomers comprising at least one electron withdrawing group adapted to improve oxidant resistance of said membrane or film.

According to some embodiments, the aromatic ionomers may include primary aromatic amine groups. According to some embodiments, the covalently crosslinking is formed through diazonium reaction.

According to some embodiments, the process may further include crosslinking with an aromatic amino containing component selected from the group consisting of an organic compound, a monomer and oligomer (for example, of di- or poly-functional primary aromatic amines), wherein the amino containing component comprises at least two aromatic groups each comprising a primary amine with a molecular weight of less than 2000 Daltons. For example, aromatic organic compounds or monomers of diamino naphthalene, 1,1,1 tris(aminophenyl)ethane or 1,3,5 tris(aminophenyl)benzene. According to one embodiment, the ionic and amino groups are on the same polymer. According to another embodiment, the ionic and amino groups are on different polymers.

Another aspect of the present discloser is the use of electron withdrawing groups to improve oxidant resistance of the membranes or films of this discloser. The term "electron withdrawing group" may refer, according to some embodiments, to a substituent that draws electrons away from a nearby reaction center. These electron withdrawing group are present on at least some of the aromatic groups of the polymers, and can inhibit oxidant or halogenation reactions by halo-oxidants, for example, by steric or electronic effects.

According to some embodiments, the electron withdrawing group may include a halide (such as F, Cl, Br), nitro group, sulfonic group, phosphonic group and carboxylic group.

In some embodiments, the aromatic ionomers used in the present discloser may include aromatic condensation polymers, such as polysulfone (PSU), polyphenylsulfone (PPS), polyphenylene sulfone, polyethersulfone (PES), polyetherketone (PEK), polyether ether ketone (PEEK), polyether ketone ether ketone, a combination of polyether ketone and polysulfone, polyphenylene sulfide, phenylene sulfone, a combination of sulfide and sulfone, poly ether based on polyphenylene oxide, 2,6 dimethyl phenylene, or any derivative thereof and/or any combination thereof. The condensation polymer derivative may include for example, a substituted condensation polymer, for example, by one or more electron withdrawing groups.

According to some embodiments, the one or more aromatic ionomers used for the preparation of the membrane or film may include sulfonated polyphenylsulfone substituted with group X (SPPSX), aminated sulfonated polyphenylsulfone substituted with group Y (YPPSNH$_2$), or a combination thereof, wherein "X" is selected from a group consisting of F, Cl, Br and nitro, and wherein "Y" is selected from a group consisting of F, Cl, Br, nitro, sulfonic, phosphonic and carboxylic group. For example, the aromatic ionomers may include nitrated sulfonated polyphenylsulfone (SPPSNO$_2$), aminated sulfonated polyphenylsulfone (SPPSNH$_2$) or a combination thereof.

According to some embodiments, the nitrated sulfonated polyphenylsulfone (SPPSNO$_2$) may include a nitro content in the range of 0.2-1.5% N w/w (for example, 0.2-0.5% N w/w, 0.5-1.0% N w/w and 1.0-1.5% N w/w) and sulfonic groups in the range of 0.2 to 2.0 meq/gr (for example, of 0.7 to 2.0 meq/gr and 0.8 to 1.6 meq/gr).

According to some embodiments, the aminated sulfonated polyphenylsulfone (SPPSNH$_2$) may include a sulfonic content in the range of 0.001-1.8 meq/gr (for example, 0.01-0.5 meq/gr and, 0.001-1.6 meq/gr) and an amino content in the range of 0.5 to 4.0% (for example, 0.5 to 3.0%) elemental nitrogen. This includes both the case where only SPPSNH$_2$ is used to form the film, and the case when at least two polymers —SPPSNO$_2$/SPPSNH$_2$— are used to make the polymer.

For example, the aminated sulfonated polyphenylsulfone (SPPSNH$_2$) may include a sulfonic content in the range of 0.2 to 1.0 meq/gr, and an amino content in the range of 0.5 to 2.0% elemental nitrogen.

In another embodiments, halo (halogen) aminated polyphenylsulfone (haloPPSNH$_2$) may be used for the preparation of the membrane or film of the present discloser.

According to some embodiments, the one or more aromatic ionomers used for the preparation of the membrane or film further may include hydroxylated aromatic condensation polymers.

According to some embodiments, the aromatic ionomers used to form the membranes or films of the present discloser may include nitrated sulfonated polyetheretherketone (SPEEKNO$_2$) or polyetherketoneetherketone (SPEKEKNO$_2$), aminated sulfonated polyetheretherketone (SPEEKNH$_2$) or polyetherketoneetherketone (SPEKEKNH$_2$) or a combination thereof.

According to some embodiments, the membrane or film may be adapted for use as a part of a composite membrane, as a part of a crosslinked asymmetric membrane, as a self standing membrane and/or as a membrane coating layer. In one embodiment, the film may be crosslinked to a support layer of the composite membrane through covalent bonds.

According to some embodiments, the membrane can be a composite nanofiltration (NF), reverse osmosis (RO) or ultrafiltration (UF) membrane.

In one embodiment, the polymers comprising the above-mentioned groups may be used to form thin films of less than several microns and preferable less than 1.0 micron on a porous UF supports with the morphology and structure arrangements of the thin selective film having good flux and rejection properties required of NF and RO membranes and which said selective structures may be covalently crosslinked in place and which said final film has good chemical resistance especially against hypochorite agents and/or other oxidants. In another embodiment, the UF support upon which the selective film is formed is also crosslinked. In another embodiment, crosslinked and oxidant resistant asymmetric UF, NF and RO membranes may be made by similar combinations of polymers and crosslinking reactions where the selective layer is an integrally denser top layer of the asymmetric membrane. Still further oxidant resistant and crosslinked films of this disclosure may also be used to modify existing membranes such as NF or RO or UF membranes and thus improve their rejection or selectivity properties. A thin film can be placed and bound to existing NF and RO membranes to improve performance, for example rejection, without a significant loss of flux. Higher rejections are important, for example, for sea water desalination, boron removal, nitrate removal and many other applications.

This disclosure may also be used to form crosslinked protective films on various substrates.

In one embodiment, the resistance of the membranes and/or film of the present discloser against oxidants is significantly improved into the range of 100,000 to 200,000 ppm-hr NaOCl or higher. Solution of 500-1000 ppm NaOCl pH 9 were used to evaluate the oxidant resistance of the membranes/film examined in the present discloser. These concentrations are accelerated tests conditions for determining stability of 96,000 to 192,000 ppm hours, which would indicate good oxidant stability.

According to some embodiments, the combination of a) ionic aromatic condensation polymers b) stable covalent crosslinking such as aryl-aryl bonds, and c) the use of electron withdrawing groups allows the achievement of stable membranes (or films) that also exhibit good flux and rejection characteristics. The term "stable" may include chemical resistance, particularly high oxidant resistance, for example resistance in aqueous halogen solution (hypochlorite). In the membranes (or films) structures according to embodiments of the invention, crosslinking minimizes swelling as well as limits the accessibility of oxidants to different reactive sites on the polymer while both the aromatic structure of the ionomer and, in addition, the electron withdrawing groups also minimize reaction with oxidants. All these factors give a synergistic improvement in stability as exemplified herein.

DETAILED DESCRIPTION

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Glossary

The term "membrane" as referred to herein may relate to a selective barrier that allows specific entities (such as molecules and/or ions or gases) to pass through, while retaining the passage of others. The ability of a membrane to differentiate among entities (based on, for example, their size and/or charge and/or other characteristics) may be referred to as "selectivity". More information regarding membranes may be found, for example, in http://www.bccresearch.com/membrane/DMD00.html and http://www.geafiltration.com/glossary_filtration_terminologies.asp.

The term "composite membrane" as referred to herein may relate to membranes that include more than one material wherein the materials may have different densities. Composite membrane may include for example "thin film composite membranes" which may generally refer to membranes constructed in the form of a film from two or more layered materials. A particularly useful composite is a thin dense film on a thicker porous support.

The term "film" as referred to herein, according to some embodiments, may relate to a self standing selective barrier (for example a selective barrier not supported by a support layer) or a coating layer deposited on/placed on or connected to a support layer and/or membrane.

The term "flux" as referred to herein may relate to a volume of treated liquid (such as, for example, water, sea water, brackish water, well water, fermentation liquors, concentration of antibiotics, municipal and industrial waste and process streams and other liquids) obtained per unit time per unit membrane surface area.

The term "permeate" as referred to herein may relate to a product, for example liquid, which has passed through a membrane. The term "permeate" may, for example, relate to a non concentrated resultant products during filtration.

The term "retentate" (may also be referred to as "concentrate") as referred to herein may relate to a fraction not passing through the membrane.

The term "rejection" as referred to herein may generally relate to a percentage of a substance (such as a salt) rejected (not allowed to pass the membrane) in a membrane (such as a reverse osmosis membrane) process. The rejection may be calculated, for example, as the percentage of salt, which is held back by the membrane. For example, $R=1-(C_p/C_b)$ where R=Rejection, Cp=Concentration in Permeate, Cb=Concentration in Retentate.

The term "micro-filtration" or "MF" as referred to herein may relate to a technique that utilizes a low-pressure cross-flow membrane process for separating colloidal and suspended particles in the range of 0.05-10 microns. MF may be used for example for fermentation broth clarification and biomass clarification and recovery.

The term "ultrafiltration" or "UF" as referred to herein may relate to a membrane separation technique used to separate small particles and dissolved molecules in fluids. The primary basis for separation may be molecular size, although other factors, such as but not limited to, molecule shape and charge can also play a role. Molecules larger than the membrane pores will generally be retained at the surface of the membrane and concentrated during the ultrafiltration process. The retention properties of ultrafiltration membranes may be expressed as "Molecular Weight Cutoff" (MWCO). This value may refer to the approximate molecular weight (MW) of a molecule, compound and/or material (such as polymers, proteins, colloids, polysaccharides, suspended solids and/or solutes), which is about 90% or more retained by the membrane. However, a molecule's shape can have a direct effect on its retention by a membrane. For example, linear molecules like DNA may find their way through pores that will retain a globular species of the same molecular weight.

Ultrafiltration membranes may be adapted to let through small molecules (such as water, low-molecular-weight organic solutes and salts) and retain high-molecular weight molecules (such as, polymers, proteins, colloids, polysaccharides, and/or suspended solids and solutes of molecular weight greater than 1,000 Dalton). UF may be performed under pressures up to about 145 psi (10 bar). UF may also relate to a technique that utilizes membranes, such as having micropores of about 1 to 100 nanometer (nm) in diameter.

Typically, separations of monovalent and divalent salts and organic solutes of molecular weights up to 1000 Dalton characterize membrane selectivity between the RO and UF regions. The range of membrane separation characteristics that are covered by this definition are currently known as NF. The term "nanofiltration" or "NF" as referred to herein may also be related to a technique that utilizes membranes that may have many different types of separation properties. For example a class of NF membranes may retain some low and medium molecular weight solutes and does not retain others. A class of NF membranes may be adapted to essentially let through monovalent ions and organic compounds with low molecular weight (typically less than about 300 Dalton) and retain multivalent ions (for example, calcium, magnesium, aluminum, sulfates ions and others), non-ionized organic compounds (for example solutes) with high molecular weight (typically higher than about 300 Dalton) and suspended solids. Another class of NF membranes may also retain low molecular organics down to 100 Dalton with rejection to both monovalent and divalent salts. Another variation of NF may retain charged organic molecules of more than 100 Dalton while passing non-charged molecules of less than 300 Dalton. Still another NF variation may readily pass organic solvents while retaining solutes of more than 100 Dalton. Typically, NF membranes' selectivity is characterized by separations of monovalent and divalent salts and organic solutes of molecular weights up to 1000 Dalton. Thus, for example, NF membranes may be available with molecular weight cut offs of, for example, 80, 50, 20 and 0% rejection to NaCl and 95+% for 1,000 MW dextran. Such membranes may be used, for example, in water softening, fractionation of pharmaceutical fermentation liquors, whey desalting with lactose retention, skim milk concentration, fractionation of sugars, concentration of antibiotics, treatment of surface water and drinking water, municipal waste treatment for agricultural use, and in numerous other industrial uses for treatment of process and waste streams.

The term "reverse osmosis" or "RO" as referred to herein may relate to a technique that utilizes dense membranes that allow solvents, typically water, to pass through while retaining any salts or/and organic solutes. RO may be used, for example, to demineralize water (such as seawater, brackish water or brine desalting) or for the production of ultrapure water. RO may be performed under high pressures.

The term "open RO" and "tight NF" often mean the same membranes and the demarcation between the two is not clear. Similarly the demarcation between "tight UF" and "open NF" is often not clear and the terms may be used interchangeably.

An "ionomer" and/or a "polyelectrolyte" may refer to polymers and/or copolymers containing both ionic and hydrophobic groups. Typically, polyelectrolytes have more ionic groups than ionomers.

A "polymer" may refer to a substance composed of molecules with large molecular mass composed of repeating structural units, or monomers, connected by covalent chemical bonds.

A "copolymer" may refer to a polymer derived from two (or more) monomer species, as opposed to a homopolymer where only one monomer is used.

A "monomer" may refer to a molecule, such as a small molecule.

"Crosslinking" or "crosslink" may refer to the formation of covalent bonds linking one polymer and/or oligomer chain to another. Crosslinking may also be brought about by interactions other than covalent bonds such as electrostatic or hydrophobic interactions. Unless otherwise stated, crosslinking refers to covalent bonds.

An "oligomer" consists of a finite number of monomer units, whereas a polymer, at least in principle, may consist of a very large (such as an unbounded) number of monomers.

The term "diazonium" group or salt, may refer to aromatic diazonium groups.

The term "aryl" (Ar) may refer to a group, a functional group and/or a substituent (such as phenyl, benzyl, naphthal, and the like) derived from an aromatic ring, such as benzene ($C_6H_6$). An aryl may be un-substituted or substituted with any substituent, such as an alkyl, alkoxy, amine or any other group.

It was surprisingly found in an effort to make generally stable membranes for industry requiring acid, base and oxidant resistance and membranes for water treatment with high oxidant and aqueous halogen (e.g., chlorine) solution resistance, that highly stable membranes with good flux and selectivity characteristics could be achieved by using, for example, the following: either aromatic ionomer polymers with ionic and amino groups on one polymer, or a mixture of polymers where the mixture comprises a polymer with aromatic ionic groups and a polymer with aromatic amino groups, where the presence of nitro or halide groups on a fraction of the aromatic sites of polymers with the ionic group are required for oxidant resistance, and for the polymer with amino groups the presence of nitro and halogen groups and/or sulfonic, phosphonic and/or carboxylic are used also for improved oxidant resistance.

In effect, it was discovered that improved oxidant resistance with good flux and rejection properties can be achieved without loss of other properties, such as acid base resistance. In effect, this added performance is achieved by adding the above-mentioned additional functional groups: nitro and halogen groups to the aromatic polymers that contain ionic groups, and nitro and halogen groups and/or sulfonic, phosphonic and/or carboxylic to the polymers which contain amino groups. These additional groups can inhibit oxidant or aqueous chlorination reactions by, for example, steric or electronic effects. The fraction of aromatic groups of the ionomer with the electron withdrawing groups (e.g., halides, nitro and sulfonic), are optimized to achieve good stability with flux and rejection and are preferably placed on only a fraction of the aromatic groups of the ionomer.

The resulting aromatic polymers can be used, for example, to form thin films of composite membranes, wherein such added groups are used to protect aromatic sites on the polymer sensitive to oxidants such as, by way of example, hypochlorite, and thus improve the oxidant and chlorination resistance of the final membrane or coating. The added groups are in addition to the sulfonic and amino groups already disclosed in patent application WO2007135689 (e.g., sulfonated polyphenylsulfone (SPPS) and the polymer with the amino groups such as aminated polyphenylsulfone ($PPSNH_2$)). The ionic groups disclosed in WO2007135689 were polymer functional groups but according to embodiments of this invention, the ionic groups which are added to the polymers that have the amino groups are mainly for the purpose of improved oxidant resistance. Nonetheless, their presence may also influence final membrane flux and selectivity.

In one embodiment, the aromatic polymer may have both ionic (for example, sulfonic) and amino groups, wherein the sulfonic groups play two roles: one is to influence selectivity and flux properties of the final membrane and second is to protect aromatic sites on the aromatic ring against oxidant attack in the final membrane. The primary aromatic amino group is used, to bring about crosslinking by conversion to a diazonium salt for aryl crosslinking, as will be explained below in further details. Thus, the amino group concentration is significantly reduced in the final membrane. An example of such a polymer is sulfonated and aminated polyphenylsulfone ($SPPSNH_2$), which for some applications is preferable than a mixture of different polymers. This polymer may also contain additional groups such as halides and nitro groups to improve oxidant resistance to a greater extent.

In another embodiment, mixtures of an aromatic ionic polymer with oxidant stabilizing groups and an amino aromatic polymer with likewise oxidant stabilizing groups are used. Often it is found that working with such mixtures gives greater control over final membrane properties. In another approach aromatic organics, monomers and oligomers of di- or poly-functional primary aromatic amines can be used to crosslink the aromatic polymers that contain ionic groups, nitro and halogen groups. Which approach is best with respect to overall membrane performance is readily determined by experimentation with different combinations.

Substitution of the Polymers

One aspect of the present invention is the substitution of aromatic ionomers with oxidant/halogenation stabilizing groups. In the following description polyphenylsulfone (PPS) is used as an example, representing the range of polymers claimed in this disclosure that will be described below. One aspect of the present disclosure is to substitute some of the non-reacted aromatic sites in sulfonated polyphenysulfone (SPPS) with nitro ($-NO_2$) groups to give sulfonated and nitrated polyphenylsulfone ($SPPSNO_2$). In addition, aminated polyphenylsulfone ($PPSNH_2$) with primary aromatic amino groups is derivatized so it also contains sulfonic groups-$SPPSNH_2$. Using $SPPSNO_2$/$SPPSNH_2$ (in a ratio of, for example, 60/40) as the combination to form a selective barrier on a porous support, and then crosslinking this thin film via crosslinking of a diazonium group derived from the amine under neutral or preferably basic conditions, can give very stable and resistant membranes with high rejections to sucrose (e.g., above 80%), even after 2, 4 and 8 days in 500 ppm NaOCl at pH 9, without loss of flux. These membranes are much more resistant than commercial membranes and other membranes, such as, for example, membranes made from a combination of SPPS and $PPSNH_2$, where the flux and/or rejection drops rapidly upon exposure to the same NaOCl solutions.

In determining the optimum degrees of substitution on the polymer the nature of the polymer is important. In the following description polyphenylsulfone (PPS) is used as an example and the optimum values of the degrees of substitution are for this polymer. Other polymers such as polysulfone (PSu) or polyethersulfone (PES) or polyetheretherketone (PEEK) may have different optimization of the various substituents. In each polymer type case the optimum degrees of substitution are readily found by experimental procedures well known in the art.

Another important factor in determining the degree of substitution of the ionomers is the fraction of aromatic groups of the ionomer with the electron withdrawing groups (e.g., halides, nitro and sulfonic), needed to achieve both good stability with flux and rejection.

In one preferred range for the polymer $SPPSNH_2$, the primary aromatic amino content is between 0.5 to 4.0% w/w of elemental nitrogen, while the sulfonic content is from 0 to ~1.8 meq/gr. In some cases the sulfonic content is from 0 to 0.5 meq/gr.

The $SPPSNO_2$ polymer may have sulfonic content of between 0.2 to 2.0 meq/gr, preferably between ~0.8 to ~1.6 meq/g, and the aromatic nitro between 0.2 to 3.5% w/w of elemental nitrogen, preferably between 0.5 to 1.0% w/w of elemental nitrogen.

In one embodiment, the aromatic $-NO_2$ groups on the $SPPSNO_2$ are replaced with halogens such as F, Cl and Br with the degrees of substitution in a similar range, but not necessarily precisely the same range, as the $NO_2$ in $SPPSNO_2$, as the properties of the groups are not identical. Similarly, in one embodiment, the sulfonic groups on the $SPPSNH_2$ are replaced with halogens such as F, Cl and Br with the degrees of substitution in a similar range as the sulfonic groups in $SPPSNH_2$, as for example 0.5 to 1.8 meq/gr, preferably between 0.8 to 1.4 meq/gr. Thus, in addition to combinations of $SPPSNO_2$/$PPSNH_2$ other combinations, such as SPPSX and $YPPSNH_2$, where X is F, Cl, Br or nitro and Y is X (F, Cl, Br, nitro), sulfonic, phosphonic or carboxylic. Not all the sites on the aromatic groups need to be substitute, as the presence of withdrawing groups with the aromatic moiety and on adjacent aromatic rings reduces or prevents oxidation and halogenation (e.g., chlorination) on the none-substituted sites. In addition, a certain critical number of non-substituted aromatic sites are needed for crosslinking to be efficient. One preferred combination is a degree of substitution of sulfonic groups in the range of 0.8 to 1.7 meq/gr, and aromatic amino groups (which are used in the diazonium reaction) with a nitrogen content of above 0.6%, preferably above 1.5% and most preferred above 2.0 or 2.5% based on nitrogen content. In some cases the aromatic polymer with the primary amino groups can be used as a crosslinker without the addition of other groups. Typical preferred values for such crosslinkers are amino concentrations as above 2.0% nitrogen content and preferably above 3%.

Crosslinking Reactions

According to one embodiment, crosslinking included in this disclosure may be the coupling of aromatic groups through diazonium salts. Without being limited to a mechanism, in one approach this is achieved by a free radical mechanism. In effect, primary aromatic amino groups on the polymers (for example, amino polyphenylsulfone or amino polysulfones based on bisphenol A) are converted to diazonium salts under acidic conditions preferably below 10° C., and then they are put under basic conditions to ultimately form free radicals which couple to form crosslinks.

This is based on arylation of aromatic compounds by diazonium salts (see Advanced Organic Mechanisms by J March 3rd addition).

In effect: ArH+Ar'N$_2$+X$^-$→Ar—Ar' under basic conditions.

When the normally acidic conditions of a diazonium salt is made alkaline the aryl portion of the diazonium salt can couple with another aromatic ring. In acidic solutions diazonium salts are ionic and their reactions are polar. When they undergo cleavage the product is an aryl cation. However, in neutral or basic solutions diazonium ions are converted to covalent compounds, which undergo cleavage to give free radicals:

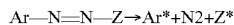
Ar—N=N—Z→Ar*+N2+Z*

In one preferred embodiment, the coating formulation of this discloser contains polymers with primary aryl amines (in effect, terminal amines H$_2$NAr— or amines on the monomer units of the polymer —(H$_2$N)Ar—) among the other groups discussed above. In one approach the polymeric amines are converted to diazonium salts under acidic conditions and applied to the surface of the support or cast as a self-standing film. The film is cured under neutral or basic conditions to give aryl-aryl coupling by one possible mechanism such as free radical coupling. This curing may entail letting the membrane stand at ambient conditions or heating, in both cases either in the dry state or in solution as a function of the materials.

In another variation, the coating formulation which contains polymers with aryl primary amines (in effect, H$_2$NAr— or —(H$_2$N)Ar—) is coated onto the support. After this coating step the coating may be dried. The aromatic amines in the coated film may be converted into diazonium salts, that may then be used to crosslink the coating by preferably aryl-aryl coupling under basic condition.

The step of aryl coupling apparently occurs after the diazonium derivatives are placed in neutral to basic pH and left to stand under different conditions which are readily optimized. Depending on the diazonium and aryl moieties present, the temperature of the reaction may be, for example, from 0 to 15° C. or under ambient conditions or at elevated temperature, for example, 30 to 210° C. The period of time given for the reaction may also range, from, for example, 2 minutes to overnight to several days as a function of the temperatures and a given chemical composition. The reaction can be performed in a solution or in the dry form.

The formation of aryl-aryl crosslinks through diazonium salts formed from primary aromatic amine containing polymers can also be achieved by using aromatic organics, monomers and oligomers of di- or poly-functional primary aromatic amines. For example, aromatic organic compounds or monomers of diamino naphthalene, 1,1,1 tris(aminophenyl)ethane or 1,3,5 tris(aminophenyl)benzene, and in some cases meta-phenylene and para-phenylene diamines. Thus, direct aryl coupling may be a preferred approach as it requires only the multifunctional monomer, oligomer or polymer with an aromatic diazonium group that may undergo crosslinking with the polymer containing the ionic and other groups such as oxidant stabilizing groups. A polymer or oligomer containing both ionic and oxidant stabilizing groups together with diazonium groups can undergo self-crosslinking.

According to some embodiments, if the polymer with the aromatic diazonium is converted to a hydroxyl group then it may undergo crosslinking with the polymer containing the ionic groups by oxidative coupling to form aryl-oxygen-aryl bond. If a polymer or oligomer contains both ionic and diazonium groups, and the diazonium groups can be converted to hydroxyl groups and then undergo oxidative coupling crosslinking, then the polymer can self-crosslink.

Another mechanism of crosslinking that may also be applied in this disclosure, involves crosslinking reactions between aryl diazoniums, aromatic hydroxyl and —SH groups. In this case, the membrane, film or blend is composed of an ionic polymer mixed with a polymer that contains a diazonium group, in addition to polymers with aromatic hydroxyl groups and/or aromatic —SH groups. The diazonium groups can react through both aryl coupling and a reaction between the diazonium and aryl hydroxyl and —SH groups to form crosslinks by aryl ether (aryl-O-aryl and sulfide bonds (aryl-S-aryl) respectively. These aromatic hydroxyl groups may be on either different polymers or the same polymer as the ionic group. It is understood that some of the polymers may be replaced with multifunctional aromatic organic compounds, monomers or oligomers. In the aforementioned polymers or oligomers there are in addition halides and or nitro groups on some of the aromatic moieties in sufficient amounts to stabilize the resultant films against oxidants.

The Ionic Polymers

In a preferred embodiment, the ionic polymers or ionomers of this disclosure are known as engineering plastics which in one approach have been modified after polymerization by one or more functional groups by methods of sulfonation, or carboxylation or phosphorylation or hydroxylation or amination or sulfhydryl or quaternization, or fluorination or chlorination or bromination or nitration or amination through various synthetic pathways well known in the art. Alternatively, they may be formed by performing the polymerization of such polymers with at least some of the functional groups, such as ionic or nitro or halogen groups, already on one of the monomer units. In this way the functional groups may be placed on different positions or different aromatic groups then when the same group is introduced on the finished polymer, for example as described above in US patent application 20060036064.

Some preferred polymers that may be used to make derivatives as described herein in accordance with some embodiments of this disclosure, are those made from condensation polymerization (may also be called poly condensation polymers) for example, polyphenylsulfone, polysulfone, polyether sulfone, polyphenylene sulfone, polyetherketone, polyether ether ketone, polyether ketone ether ketone, polyphenylene sulfide, and variations of sulfide and sulfone in the same polymer and other variations of polyether ketones and polysulfones. In additional embodiments, there is provided polyethers based on polyphenylene oxide such as 2,6 dimethyl phenylene, aromatic, and halomethylated derivatives of the above polymers. Thus, some of the categories of the preferred ionic polymers may be derived from a polysulfone (PSU), polyphenylene oxide (PPO), polyphenylene sulfoxide (PPSO), polyphenylene sulfide (PPS), polyphenylene sulfide sulfone (PPS/SO$_2$), polyparaphenylene (PPP), polyphenylquinoxaline (PPQ), polyarylketone (PK) and polyetherketone (PEK) polymer, polyethersulfone (PES), polyetherethersulfone (PEES), polyarylethersulfone (PAS), polyphenylsulfone (PPSU) and polyphenylenesulfone (PPSO$_2$) polymer; the polyetherketone (PEK) polymer comprises at least one of a polyetherketone (PEK), polyetheretherketone (PEEK), polyetherketone-ketone (PEKK), polyetheretherketone-ketone (PEEKK) and polyetherketoneetherketone-ketone (PEKEKK) polymer; and the polyphenylene oxide (PPO) polymer comprises a 2,6-diphenyl PPO or 2,6 dimethyl PPO polymer. Preferred polyetherketone polymers include polyetherketone (PEK), polyetheretherketone (PEEK), polyetherketone-ketone (PEKK), polyetheretherketone-ketone (PEEKK) and polyetherketoneetherketone-ketone (PEKEKK) polymers. Other preferred ion-conducting materials for use in the present disclosure, but less preferred because of their reduced oxidant resistance, include polystyrene sulfonic acid (PSSA), polytrifluorostyrene sulfonic acid, polyvinyl phosphonic acid (PVPA), polyvinyl carboxylic acid (PVCA) and polyvinyl sulfonic acid (PVSA) polymers, and metal salts thereof. More preferably, the ion-conducting material comprises a sulfonated derivative of a polysulfone, polyphenylsulfone (PPSU), polyphenylene sulfone, polyethersulfone (PES), polyphenylene sulfoxide (PPSO) and polyphenylenesulfide-sulfone (PPS/$SO_2$). In addition to linear polymers or slightly branched polymer, highly branched polymers may also be used. The above condensation polymers may also be made branched and more highly functionalized by the use of monomers with more than two functional groups. For example, Fritsch D, Vakhtangishvilli L. and Kricheldorf H R (2002) J of Macromolecular science A vol 39 (11): 1335-1347 and in J polymer Science A Vol 40 (17): 2967-2978 "Synthesis and functionalization of polyethersulfones based on 1,1,1 tris(4-hydroxyphenyl)ethane" and in Weber et al US Patent Application No. 20040242807.

Some preferred homopolymers and copolymers are, for example, random copolymers, such as RTM.Victrex 720 P and RTM.Astrel. Especially preferred polymers are polyaryl ethers, polyaryl thioethers, polysulfones, polyether ketones, phenylenes, polyphenylenevinylenes, polyazulenes, polycarbazoles, polypyrenes, polyindophenines and, especially polyaryl ethers. Examples of commercial sources of some of these polymers are: Solvay, ICI, BASF. Examples of Solvay polymers include: UDEL™ polysulfone, RADEL™ polyether sulfone and RADEL™ R polyphenylsulfone, as well as SOLEF™ fluoropolymer. Some other non-limiting examples of sulfonated ionomers and their degree of substitution are: sulfonated polyphenylsulfone 0.4 to 2.0 meq/gr, sulfonated polysulfone 0.4, to 1.8 meq/gr, sulfonated polyether sulfone 0.6, to 1.4 meq/gr, sulfonated polyether ether ketone 1.0 to 3.0 meq/gr, sulfonated polyether ketone 0.8 to 2.5 meq/gr. The counter ions of the ionomer or polyelectrolyte ionic groups, when added in minor amounts to the ionomer combinations, may be chosen from a wide range during fabrication of the membrane or in there use, examples are $H^+$, $Li^+$, $K^+$, $Na^+$, $NH_4^+$ and alkyl quaternary ammoniums and others. Multivalent ions, in some cases may, be chosen from a large selection, for example Ca, Mg, Zn, Ba, ions.

Another useful category of polymers for derivatizing into ionic polymers and other functional groups, such as halides and nitro groups, are polyphenylene polymers such as poly (p-phenylene) and poly(p-xylylene). Examples of such polymers are given in patent application US 20050261459, disclosing polymers comprising monovalent endcappers, divalent linear units, and polyvalent branching units. The composition of the polymers is controlled by adjusting the ratio of the three types of monomers. Other polyphenylene polymers are disclosed in U.S. Pat. No. 5,227,457. They may be semi-rigid as disclosed in U.S. Pat. No. 5,886,130, and may have reactive side groups as disclosed in U.S. Pat. No. 5,625,010, or end groups as disclosed in U.S. Pat. No. 5,670,564. Polyphenylenes may also have a branched (Kovacic et al., Chem. Rev., 1987, 87, 357-379), or hyperbranched structure (Kim et al., Macromol., 1992, 25, 5561-5572). The polymer derivatives of this disclosure may be derived from, polyphenylsulfone, polyetherketone, polyetheretherketone polypropylene, polystyrene, polysulfone, polyethersulfone, polyetherethersulfone, polyphenylenesulfone, poly(bisbenzoxazol-1,4-phenylene), poly(bisbenzo(bis-thiazol)-1,4-phenylene), polyphenyleneoxide, polyphenylenesulfide, polyparaphenylene, In addition, polytrifluorostyrene sulfonic acid, polyvinylphosphonic acid, and polystyrene sulfonic acid may be also used as additives in some embodiments. In all, the groups for stabilizing the polymers against oxidants and against reactions such as chlorination, which were discussed above, are present on at least some of the aromatic groups of the polymers.

According to another aspect of this disclosure, as mentioned previously, the polymeric components of this disclosure may be chosen from the category of relatively oxidant resistant homo-polymers of the structures, but may also be, co-, tri- and tetra-polymers, block copolymers and graft copolymers. In the case of co-, tri- and tetra-polymers, block copolymers and graft copolymers, the ionic portion will be in at least one of the components, wherein the other components may have different compositions with different functions. These different characteristics may be hydrophilicty/hydrophobicity, reactivity, and crystallinity versus amorphous structures. For example, sulfonated polysulfone may be the homopolymer used to make the selective layer, but in another embodiment the sulfonated polyarylsulfone may be one of the blocks of the block copolymer of polysulfonated-block-polyvinylidene fluoride. See patent application US 20060047095 and references therein, and European polymer journal 2004 40(3) 531-541 Yang et al and Y Yang et al Macromolecules 2004, 37(5) 1678-1681. In this case the PVDF may be used to adjust morphology or be used for crosslinking. Methods for crosslinking polyvinylidene fluoride, sulfonated polyvinylidene fluoride and other fluoropolymers are known, see for example U.S. Pat. Nos. 3,516,791 and 3,840,646, as well as Fluoropolymers, L. A. Wall, ed., High Polymers, Vol. XXV, Interscience 1972. Polyvinylidene fluoride blocks, oligomers and polymers may be crosslinked with free radical sources such as AIBN, benzoyl peroxides and inorganic free radical sources such as persulfate, and the redox couple of persulfate/sulfite. In all, the groups for stabilizing the polymers against oxidants and against reactions such as chlorination from hypochlorite solutions, which were discussed above, are present on at least some of the aromatic groups of the polymers.

Another consideration in the use of ionomers is the placement of the ionic groups, for example, as in patent application US 20060036064. A representative example is formation of sulfonated polysulfone, which may be achieved in the following two approaches, each of which has different implications for the final membrane. According to the first approach, sulfonation of bisphenol poly(arylene ether sulfone), for example, is performed after the polymer is formed resulting in sulfonic groups placed on the activated ring of the polymer. According to the second approach, polymerization is performed with a sulfonated monomer, which offers the opportunity of placing the sulfonic group on the deactivated ring. The concentration of sulfonic groups and there placement directly affects membrane properties. For example, the polymer which had been prepared by the polymerization of the sulfonic groups on the deactivated rings, gives a membrane with improved conductivity (for fuel cell (FC) applications) and better stability over membranes made with polymers sulfonated after polymerization. In one aspect, the choice of such polymers, with the sulfonic groups placed on the deactivated rings, allows for crosslinking reactions described in the disclosure to take place through the more activated rings. In all of the polymers, groups adapted to improve the polymers resistance against oxidants and aqueous halogenation (e.g., chlorination) reactions, which were discussed above, are present on at least some the aromatic groups of the polymers. Their presence increases oxidant resistance to levels required for the membrane application, for example in water treatment, exposure to hypochlorite of at least 20,000 to 200,000 ppm hrs.

Aryl amino derivatives of the engineering plastic described in this disclosure may be derivatized from nitro or amino containing polymers, for which many methods are known in the art. A non-limiting example of the procedures used for nitration to nitro derivatives and then reduction of the nitro derivatives to amino derivatized polymers is given in W. H. Daly and S. Lee and C. Rungaroonthaikul "Modification of Condensation Polymers" Chapter 1 in Chemical Reactions on Polymers, ACS Symposium Series 363 (1988). These aryl amino derivatives are then used to form diazonium salts, which depending upon the pH of the system, may undergo aryl substitution or coupling reactions by various mechanisms. Conversion of amino groups to diazonium salts is well known in the art. And further conversion of the diazonium salts into aryl —OH and aryl-SH groups are also well known. In addition, the conversion of aryl-S-aryl to diaryl sulfones is well known in the art.

Variables in Fabrication of the Membranes, Films and/or Coatings Disclosed Herein In the process of achieving a given morphology of the selective membrane, film and/or coating of the present discloser, the choice of components and the details of the fabrication, such as the sequences in which the components of the solution are added, the solvents used, pH and temperatures, post treatments, multiple layers vs. single layers, may be important considerations. These considerations are covered, in any variation and/or combination, under the scope of this disclosure.

The possibility of using environmental friendly and non-toxic solvents may be an advantage. For example, the thin film of the composite membrane of this disclosure may be formed by coating an existing porous support, such as UF support, wherein the solvent for the coating is from an essentially aqueous based solvents, such as a water and alcohol mixture, which dissolves the polymers but does not attack the support. This and other solvent combinations may also contain solvents such as, but not limited to, formic acid, acetone, acetonitrile, formamide, and additives which may, for example, help to avoid a collapse of the support on drying or maintain the integrity of the film. Example of a preferred additive is glycerol, and other polyhydroxy compounds which prevents or minimizes support collapse or compaction upon drying or heating during crosslinking or post treatments.

Non-aqueous solvents may also be used, as for example formic acid and formic acid mixtures with other solvent, such as described in U.S. Pat. Nos. 4,990,252 and 5,922,203. Solvents, which in high concentrations would dissolve the support, may be used in low concentrations in mixtures with non-solvents. Non limiting examples of such solvents are dimethylformamide (DMF), N-methylpyrrolidinone (NMP), dimethysulfoxide (DMSO), toluene. Salts may also be added to the coating solution to improve solubility of the coating polymers in the coating solution or final membrane performance, as described in U.S. Pat. No. 4,990,252. An example of preferred salts are lithium salts, such as lithium chloride, and lithium hydroxide.

Chemical Binding of the Selective Membrane, Film and/or Coating Layer to its Support Composite membranes, wherein the thin selective film is not only crosslinked but also chemically bound to the porous support component of the composite are under the scope of this discloser.

Resistance Characteristics of the Disclosed Membranes, Films and/or Coatings

With respect to selective barriers, the disclosed membranes, films and/or coatings may have superior combinations of chemical resistance, flux or permeation rates and selectivity over membranes of the art. The chemical resistance may refer to for example, acids, bases and/or solvents, and in particular to oxidant resistance and resistance against aqueous halogenation reactions, such as chlorination, and combinations of more than one afore-mentioned resistance characteristics, as for example oxidant resistance in combination with acid/or base or solvent resistance.

The Extent of Crosslinking of the Disclosed Membranes, Films and/or Coatings

Crosslinking is a significant aspect of achieving stable membranes. The crosslinking may involve essentially all the components of the membrane film and/or coating, or only the components containing the ionic groups, or only a crosslinked matrix in which the components with ionic charge are embedded but not chemically crosslinked. The support of the coatings or films, such as a UF support may also be crosslinked. If the UF support is a ceramic or a glass it is an inherently crosslinked 3D structure. Of the different categories of crosslinking, the crosslinking is by covalent bonding, though it may exist in the presence of secondary crosslinks such as ionic, hydrogen bonding or hydrophobic interactions.

Categories of the Disclosed Membranes

The disclosed membranes may roughly be divided to the following groups, (of course other grouping approaches may also be acceptable:

a) Composites NF, RO, UF
b) Crosslinked UF and MF supports by the disclosed chemistry
c) Gas separation membranes
d) Existing NF and RO membranes modified by the chemistry of the disclosure The Disclosed Coatings and Coating Processes for Use in Modification of Existing Membranes Another embodiment of the present discloser is the use of the materials, coatings, coating processes and crosslinking processes in modifying existing membranes, such as commercial UF, RO, NF, and gas separation membranes, to improve their performance, for example by improving rejection. Very thin films can be placed and bound to existing NF and RO membranes to improve rejection with a minimal loss of flux. Higher rejections are needed in many applications, for example, seawater desalination, improved boron or nitrate or silica removal in sea and brackish water, to name a few applications.

Morphologies of the Disclosed Membranes, Films and/or Coatings

The selective films and/or coatings of the membranes disclosed herein may include, for example, homogeneous single polymer, a homogeneous or heterogenous blend of at least two polymers or other components (such as, inorganic or ceramic or metals or anion or cation exchange particles of nano or micron dimensions), or a mosaic distributions of one or more components in a matrix of another component.

Single and Multiple Layers

The selective membranes, films and/or coating of this discloser may include a single layer or multiple layers (such as two or more, three or more layers).

In one embodiment, the present disclosure relates to novel permselective barriers and the membranes they form with many applications, as for example, in water desalination, treatment of industrial process and waste streams and energy conversion devices. The following category membranes are included in the disclosure-NF, RO, UF, and gas separation membranes. With respect to selective barriers the disclosed membranes have superior combinations of chemical resistance, with good flux or permeation rates and selectivity's over membranes of the art. The chemical resistance refers to acid, base and optionally solvent resistance and in particular to oxidants and halogenation resistance. The membranes of this disclosure may be in all possible configurations as for example flat sheets, spiral wound, hollow fibers, capillaries, tublets, and tubes. It is understood that the membranes in some of these configurations (e.g., flat sheets, spirals and tubes may also comprise other support materials such as non-woven, clothes and nets). The disclosed selective barrier of these membranes is based on building blocks chosen from polymers or polymer segments or monomers. The chemical functions of these building blocks and the methods of forming the final membranes are designed for achieving the advantage of high chemical resistance (acid, base and optionally solvent resistance, and in particular to oxidants and halogenation resistance) while retaining adequate or superior flux and selectivity for a given application. Thus, the characteristics of the disclosed membranes are chemical resistance with good selectivity, flux and ease of cleaning because of membrane stability. In another embodiment of the disclosure, the materials, and coating process and crosslinking may be used to modify existing UF, NF and RO membranes to improve their performance by, for example, improving their rejection. Very thin films can be placed and bound to existing NF and RO membranes to improve rejection with a minimal loss of flux.

Crosslinking is a significant aspect of achieving stable membranes. The extent of crosslinking of the disclosed membrane, film or coating may involve all the components of the membrane film or coating, or only the components containing the ionic groups, or only a crosslinked matrix in which the components with ionic charge are embedded but not chemically crosslinked.

Crosslinking is brought about by first converting a primary aromatic amino group to a diazonium group. The diazonium group is then exposed to different conditions, which brings about crosslinking between polymer chains, as evidenced by the lack of solubility and reduced swelling in strong solvents and after exposure to hypochlorite or acids and bases. An important point of this crosslinking is the concurrent reduction of oxidant sensitive moieties containing nitrogen atoms, such as in azo and amino groups. Without being limited to the following mechanisms the following mechanisms are put forward as possible crosslinking mechanisms: In effect-crosslinking through aromatic diazonium groups may be accomplished by first mixing by way of example an aromatic polymeric ionomer (preferably a condensation polymer) where the ionic groups may be sulfonic carboxylic, phosphoric, quaternary ammonium and the said polymer also containing the aforementioned stabilizing groups such as halides and nitro groups and an aromatic polymer (such as polysulfone, polyphenylsulfone (PPS), polyethersulfone (PES), polysulfone (PSU) and polyetheretherketone (PEEK) containing aromatic amino groups also with the with at least one of the aforementioned stabilizing groups which may also include for the amino containing polymer ionic groups such as sulfonic groups. The resulting polymer mixture may be cast and/or placed onto a support, and converting at least a portion of the amine groups into diazonium groups which may then crosslink the membrane through aryl coupling with the possibility of some azo coupling also occurring. Alternatively, a single polymer may be used with ionic groups and amine groups where the ionic groups plays two roles of contributing to the flux and rejection properties and at the same time stabilizes the structure against oxidants and in another embodiment additional groups such as halides or nitro group may also be present to enhance resistance in the single polymer formulation.

In all cases the amine groups are converted to diazonium salts which are used to crosslink the selective barrier in place. Thus the diazonium groups may then be reacted or decomposed (for example by making the pH of the film neutral or basic, with or without heating), to obtain the crosslinking in the membrane, coating and/or film. Under these conditions crosslinking may occur by aryl coupling and to some extent azo coupling. In a less preferred approach after the diazonium step keeping the pH of the film acidic and heating at elevated temperatures to achieve aryl-aryl coupling by an aryl cationic coupling mechanism. This is less preferred to the extent that as it may also result in a relatively high % of azo coupling whose products are not as oxidant resistant as aryl-aryl coupling bonds. In a third approach aromatic polymers or lower molecular oligomers or monomers or organic compounds with multifunctional hydroxy or sulfides on the aromatic groups may be added to the mixture which would react with the diazonium to form aryl-ether-aryl and aryl-sulfide-aryl crosslinks respectively and wherein the sulfide groups may be further oxidized as for example to sulfoxides and sulfones. These aromatic polymers or lower molecular oligomers or monomers with multifunctional hydroxy or sulfides on the aromatic groups may also contain nitro and halides as well as other stabilizing groups as needed to improve oxidant resistance of the final membranes.

In one embodiment, there is provided the use of chemically resistant aromatic condensation polymers that contain an ionic charge (such as, sulfonic, phosphonic, carboxylic, quaternary ammonium groups), hydrophobic aromatic backbone groups and aromatic amino groups for crosslinking by the method of this discloser, which can be on the same or different polymer. The aromatic moieties further contain groups such as halides or nitro. The aromatic amino groups are converted to a diazonium which is then used directly, or as an intermediate to form one or more other groups (such as, hydroxyl, sulfide), that crosslinks through one or more of the following bonds: direct aryl coupling (in effect aryl-aryl), or aryl coupling through ethers, sulfides or sulfones. In direct aryl coupling, decomposition or conversion of diazonium salts into radicals or aryl cations is followed by aryl coupling. Thus, in one case, the selective barrier contains polymeric ionic groups that are crosslinked by at least aryl-aryl coupling, and/or aryl ether aryl (aryl-O-aryl), and/or aryl-sulfide-aryl (aryl-S-aryl) or/and aryl-sulfone-aryl (aryl-S(=O)$_2$-aryl) bonds. Two mechanisms of crosslinking are aryl coupling and oxidative coupling, and they can crosslink both derivatized and non derivatized aromatic rings of a polymer or oligomers. This is important for binding thin selective films to porous supports and for the efficient crosslinking of films in general that contain both derivatized and none derivatized components. One of the crosslinking mechanisms is the crosslinking through aryl-O-aryl or aryl-S-aryl moieties by reaction of stable aromatic polycondensation polymers containing diazonium groups with aromatic hydroxyl containing monomers, oligomers and polymers or via sulfide (S=) or aromatic monomers, oligomers and polymers that contain sulfides (—SH), optionally followed by oxidation to aryl sulfones. Another mechanism of crosslinking is oxidative coupling of hydroxyl containing monomers, oligomers and polymers.

The disclosure may also be defined, in one embodiment, as a polymer blend which contains at least a polymer component with ionic groups and hydrophobic groups (as for example, in polymeric ionomers) with halides or nitro groups on at least some of the aromatic moieties mixed with another polymer component containing other groups that can undergo crosslinking to give a crosslinked selective barrier through the crosslinking groups. These polymers may also optionally contain halides and nitro groups. Instead of (or in addition to) having the ionic and crosslinking moieties on different polymers, there is also provided, according to some embodiments, a blend of different polymers where at least one of the polymers of the blend contains both the ionic groups and the other groups which can undergo crosslinking as in above, to form a crosslinked film or barrier. Or another embodiment of the disclosure, where the selective barrier or selective film is not a blend of different polymers but is made of only one polymer which contains both ionic groups and the other groups which can undergo crosslinking. In both embodiments, of a blend or a single polymer, the polymers also contain on a fraction of the aromatic groups halides or nitro groups in the amounts needed for enhanced chemical resistance.

Direct aryl coupling, in one embodiment, is a preferred approach as it requires only the monomer, oligomer or polymer with a diazonium group, that may undergo crosslinking with the polymer containing the ionic groups. If the diazonium group is on the ionic oligomers and/or polymers, then only this oligomer/polymer is required. Thus, a polymer or oligomer with both ionic and diazoniums can self-crosslink. If the diazonium is converted to a hydroxyl group, it may undergo crosslinking with the polymer containing the ionic groups by oxidative coupling. The oligomers and polymers with ionic groups can also contain the aromatic hydroxyl groups. Thus, a polymer or oligomer with both ionic and diazoniums can self-crosslink. In another mode of crosslinking, if oligomers and polymers with the aromatic —OH (hydroxyl) groups are used, then they may react with the diazonium group to form an aromatic-O-aromatic crosslink. If oligomers and polymers with the aromatic —SH groups are used, then they may react with the diazonium groups. This polymer or oligomer forms an aromatic-S-aromatic crosslink.

Direct aryl coupling with a diazonium group may undergo crosslinking with the non-ionic repeat units of the same polymers or with non-ionic aromatic hydrophobic or polar polymers or oligomers of different polymers. This is an aspect of the disclosure as it may also be used to modify the hydrophobicity/hydrophilicity balance of the membrane film or coating by crosslinking into it a hydrophobic or polar component. In another embodiment, it may be used to bind the film or coating to a support as in the formation of composites. In another aspect, it may be used to form solvent resistant ultrafiltration and microfiltration supports.

Achieving the morphology needed for the required membrane selectivity is another aspect. The selective films of the membranes may be a homogeneous single polymer, a homogeneous blend of at least two polymers or other components (for example, inorganics or ceramics or metals), heterogenous blend of at least two polymers or other components (for example, inorganics or ceramics or metals) or a mosaic distributions of one or more components in a matrix of another component. The selective films may be a single layer as described or at least two layers which each layer being the same or different in composition.

In achieving a given morphology needed for the selective film the choice of components and the details fabrication such as the sequences in which the components of the coating solution are added, the solvents, pH and temperatures, post treatments are important considerations. For example, typical solvent combinations of this disclosure can be water with alcohols such as ethanol, propanol and butanol, or solvent combinations with formic acid as described in U.S. Pat. No. 4,990,252, as for example formic acid with ethanol, acetonitrile, water, or acetone. These solvent mixtures are an advantage in that they will not attach many polymeric supports and are environmentally friendly. Other solvents such as THF, ethyl acetate, and aprotic solvents (e.g., DMF, NMP etc.) can be used, as long as their final concentration is sufficiently low to prevent deformation or excessive swelling of the support being coated. Glycerol may also be added as a solvent and as a component that prevents collapse of some porous supports upon heating. Methods of forming the selective films that achieve the morphologies required for the desired selectivity, are, for example: coating the film at one pH, and then crosslinking at a second pH, or the use of counter ions, such as lithium or ammonium ions for increasing polymer solubility in the coating or casting solutions, or increasing flux in the final membranes or multivalent counter ions chosen from the alkaline earth (Mg, Ca and others) or transition metals or their oxides or alkyl oxides (Ti, Zr, Zn and others) to orient the films by complexation, or by the use of other additives such as water soluble polymers which introduce viscosity in the forming films and/or orientation.

The thin selective layer of this disclosure is made by different methods, such as the well known methods of coating a wet film onto a porous support and removing the solvent by evaporation with, for example, heat or hot blowing air or other gases, followed by chemical treatments to form the diazonium and then a change in pH followed by a heating or curing step or applying the coating solution under pressure or vacuum application followed by a chemical treatment to form the diazonium for crosslinking or curing step without significant heating or with a heating step prior or during crosslinking for further evaporation of residual solvents and/or heat curing step to initiate a chemical reaction that brings about or completes a curing crosslinking reactions, and an optional coatings and/or optional non-coating post-treatment. There may also be an intermediate layer between the porous support and the selective layer. The step that is used to crosslink the selective layer may also be used to chemically bind the selective layer to the support.

In other cases, the polymers of this disclosure may contain additional or other ionic groups such as, —$PO_2H_2$, —$CH_2PO_3H_2$, —COOH, —$OPO_2H_2$, —$OPO_3H_2$, —$OArSO_3H$. In another embodiment, the ionic charge may be an anion exchange groups such as ammonium, sulfoniums or phosphonium. In another embodiment, the selective layer may have an amphoteric or mosaic charge distribution and contain both anion and cation exchange groups. For examples of phosphonates, see Solid State Ionics, 97 (1997), 177-186. For examples of carboxylated solid polymer electrolytes, see Solid State Ionics, 40:41 (1990), 624-627. The ion-conducting material may comprise, for example, a sulfonated derivative of at least one thermoplastic aromatic polymers. The synthesis of such polymers is well known in the art (see for example, U.S. Pat. Nos. 4,413,106, 5,013,765, 4,273,903 and 5,438,082, and Linkous, et al., J. Polym. Sci., Vol. 86: 1197-1199 (1998). In all the different polymers categories used in forming the invented membranes, groups for stabilizing the polymers against oxidants and against halogenation, such as chlorination, are present on at least some of the aromatic groups of the polymers. These may be added to the polymers with well known processes or be present in the monomers that make the polymers.

The modification of aromatic polymers by lithiation has been reported, for example, in U.S. Pat. No. 3,402,144.

Methods for forming ionomers with different functional groups relevant to the present application, for example on polysulfones, polyarylene, polyethersulfone and polyphenylsulfone, can be found in patents such as U.S. Pat. Nos. 4,598,137, 4,797,457, and 4,894,159. Methods of forming hydroxylated polysulfones are given in JP2000072965 and JP2000309707 patent applications. Methods of amination of engineering plastics are well known in the art (for example Chapter 1 in "Chemical Reactions on Polymers" editors J. L. Benham and J. F. Kinstle, ACS Symposium Series 364 1988) and can be used to form the polymer primary aromatic amine derivatives of this disclosure.

Thus in a preferred embodiments, the ionic polymers or ionomers of this disclosure are known as engineering plastics which have been modified after polymerization by methods of sulfonation, or carboxylation or phosphorylation or hydroxylation or amination or sulfhydryl or quaternization, through various synthetic pathways well known in the art and some of which procedures references are given above. Alternatively, they may be formed by performing the polymerization of such polymers with ionic groups already on one of the monomer units. In this way the functional groups may be placed on different positions or different aromatic groups then when the same group is introduced on the finished polymer. For example as described above in patent application US 20060036064.

The selective film structures that are covered under the scope of this disclosure, include, for example, ionic charge with halides and/or nitro groups on some of the aromatic rings to stabilize the polymer against oxidants. Examples of ionic charge are: 1) anionic charged membranes based on anionic groups preferably sulfonic, and phosphonic, and carboxylic groups 2) cationic charged membranes with groups such as quaternary ammonium, sulfonium, phosphonium 3) membranes which are amphoteric mixtures of anionic and cationic groups 4) membranes which are mosaic mixtures of anion and cation charged domains. In one variation, one charge sign is dispersed in a matrix of the other charge sign. In another variation, both charges are dispersed in a neutral or significantly less charged matrix of either charge 5) layers containing alternating net ionic charge, as for example, a first layer of cationic groups followed by a layer with anionic groups. The selective ionic film may have ionic capacities that may vary, for example, between 0.2 to 2.5 or more preferred 0.6 or to 2.0 or to 0.6 to 1.6 ion exchange charge capacity, as a function of the specific polymer and the required selectivity flux relationship for the application.

The importance of amphoteric and mosaic structures lies in the unique selectivity that can be achieved for certain applications. For example, by mosaics membranes with high organic rejections but with salt passage of both monovalent and divalent or trivalent ions are possible. For other applications, by way of non-limiting examples a) membranes that separate monovalent salts from multivalent salt, b) membranes with relatively high monovalent salt rejections having partial passage of divalent salts may be achieved by the disclosed invention. In addition, the control of divalent versus monovalent salt passage may be achieved by variations of amphoteric or mosaic membrane structures as disclosed herein.

Methods for hydroxylation of aromatic polymers are 1) lithiation as described in U.S. Pat. No. 4,797,457, followed by conversion to hydroxylated polymers 2) sulfonation followed by hydrolysis in aqueous alkali. In this method there is a partial formation of hydroxyl groups. The usual method of fusion in caustic may also be used in some cases but generally causes side reactions 3) formation of amines and conversion to amides, rearrangement to esters and finally hydrolysis to hydroxyl groups.

The ionomers may be mixed with non water swelling polymers but may nevertheless be dissolved in solvent combinations which dissolve both the ionomer polymer and the other polymers without dissolving the support upon which they are cast. Small amounts of solvents which may dissolve the support in higher concentrations may be added in low concentrations to the other solvents (which do not dissolve the support) of the coating formulation to enhance solubility of the coating polymers as needed.

Other polymers may be added to the ionomers or mixtures of polymers, such as water soluble polymers chosen from a) polyvinyl alcohol and its copolymers, or b) polyalkylaxazoles, or sulfonated polystyrenes and its copolymers and the like. Some of these water soluble polymers may undergo crosslinking, and others may be used as viscosity enhancers and modifiers of the selective films morphology and thus modifiers of final flux and selectivity properties. These polymers may not have oxidant resistance but may be used in conjugation with the major polymer components which do have oxidant resistance to modify the final properties of the polymer.

The synthesis of the polymers having functional groups of —$SO_3H$, —POOH, —COOH, —OH is described herein. In one preferred embodiment, the sulfonated polyether ketones described in U.S. Pat. No. 6,632,847 are included in the disclosure as per the material and the methods of synthesis and processes describe therein. In particular, there is provided, according to some embodiments, polyether ketone polymers backbone structure, sulfonated polyether ketones having the repeat unit —O—Ar—CO—Ar— with an IEC of about 1.3 to 4.0 meq (—$SO_3H$)/g of polymer. Sulfonated, strictly alternating polyether ketones with the repeat unit —O—Ar—CO—Ar— are described in J. Polym. Sci.: Vol. 23, 2205-2222, 1985 and were synthesized in this case by electrophilic attack, and not nucleophilic attack described in EP-A-0152161. The polymers were sulfonated by sulfur trioxide using triethyl phosphate in dichloroethane. There are different methods known in the art to introduce sulfonic groups into aromatic polymers, such as polyarylenes, polyaryl polymers (for example, polysulfone (PSu), polyphenylsulfone (PPS) and polyetheretherketone (PEEK)) through concentrated sulfuric acid, fuming sulfuric acid, chlorosulfonic acid, sulfuric anhydride or a sulfuric anhydride triethylphosphate chlorosulfonic acid, sulfuric acid, sulfur trioxide and sulfur trioxide complexes, sulfonyl chloride and various other reagents. According to some embodiments, these methods and resulting polymers are included under the scope of the present disclosure. Examples of these procedures and polymers are found in patents U.S. Pat. Nos. 5,348,569, 6,632,847, 4,504,852, 5,348,569, 5,364,454, 5,071,448, 4,508,852, 6,103,414, 5,128,378, 4,413,106, 5,013,765, 4,273,903 and 5,438,082, and in Linkous, et al., J. Polym. Sci., Vol. 86: 1197-1199 (1998).

Counterions for the anionic groups may be hydrogen ion, a metal cation, preferably $Li^+$, $Na^+$, $K^+$, $Rb^+$, $Cs^+$, $NH_4^+$, or an optionally alkylated ammonium ion, appropriately for hydrogen or $Li^+$, in particular for hydrogen. The nature of the counter ion is in some cases an important issue in the storage of polymers with sulfonic groups. For example, aromatic sulfonic groups may have a longer shelf life under storage either as a powder or a film or a membrane when the counter ion is Li or other metal ions, compared to hydrogen ($H^+$) ions. Lithium is often a preferred counter ion for preparing the coating as its solubility in solvents is often similar to the H counter ion, which is higher than that of other metal ions such as Na. Alkyl ammonium derivatives counter ions may also be used to enhance solubility. The issue of polymer solubility in solutions which are used as coating solutions or film forming solutions is important in determining, in part, the selective layer or membranes or films final morphology, which is often important in determining selectivity and flux properties, and in some case also stability. The nature of the counter ion and the solutions' pH and dielectric and solubility parameter values may also be used to influence the interaction between the different polymers and thus influence final membrane properties. The optimum polymer solutions can be found by systematic optimization of the solution properties by variables and parameters well known in the art.

In one embodiment of the present disclosure, amphoteric or mosaic blends of anionic and cationic polymers are made to achieve different selectivity than what is possible with selective barriers of only one charge. Different approaches to making quarternized derivatives of condensation engineering plastics to form quarternized ionomers are given in U.S. Pat. No. 5,028,337. These methods and other methods (U.S. Pat. Nos. 4,839,203 and 4,797,187) for forming quaternary ammonium, sulfonium and phosphonium are well documented in the state of art.

In one embodiment, the disclosure is a material combination and a process to form thin film coatings of less than 2 microns and preferably submicron on a porous support. In one preferred embodiment, the porous support is an asymmetric UF support, and the thin films have ion exchange capacities (as a function of the particular coating polymers used) from 0.4 to 3.5 meq/gr, and preferably 0.6 to 2.0 meq/gr, or 0.8 to 1.6 meq/gr crosslinked within at least one component with controlled swelling which gives relatively stable flux and rejection. Without crosslinking instability would have occurred by uncontrolled swelling. The range of thickness of thin selective barriers on the support that can be formed in the disclosure may range between 5 nm to 5000 nm and preferably, in some embodiments, from 20 nm to 500 nm and in other embodiments between 30 nm to 300 nm.

The process of forming the membrane in one embodiment comprises:

1. Forming a polymer solution containing some or all of the components of the selective film in a solvent or solvent mixture which will not dissolve the support upon which the composite is formed. For example, many ionomers and other components may be dissolved in a formic acid solution or an alcohol water mixture such as ethanol/water.

2. Applying the solution of the ionomer polymers prepared in "1" above to the skin face of an organic asymmetric UF membrane, which is formed, for example, by the process of phase inversion of an engineering plastic or mixture of plastics material, to form a wet film on the surface of the support. The application to the surface may be performed under atmospheric pressure, by well known coating methods such as dip coating, Gruever, kiss coating, immersion coating, or under a pressure higher than 1 atm applied to the coated surface or vacuum from the opposite side to which the solution is applied. In another embodiment, the support for the coating may be a porous inorganic or ceramic support.

3. Drying the applied solution by heat and/or gas (e.g., air) blowing, and subsequently or simultaneously curing or performing at least one heat treatment and/or at least one chemical treatment(s) of the membrane from step 2.

4. Optional post-treatment of the applied membrane are by acid, bases and or/and oxidants or/and further heat curing optionally under pressure, under vacuum, air, nitrogen, rare gases, and others which may be used to achieve crosslinking reactions between the all, or/and some of the components of the coated films. In one example, the thin layer is applied to the support in one pH in order to achieve an optimum morphology for flux and rejection. After this layer is deposited, a second solution is applied at a different pH or with other components optimal for crosslinking in a subsequent step.

5. The solution of the ionomer polymers is essentially achieving the desired membrane. The solvent may be essentially one solvent or a mixture of solvents. The solvent or solvent mixture should dissolve the polymer(s) without dissolving the supports. One preferred solvent combination is of low alkyl alcohols, such as methanol, ethanol, isopropyl and propyl alcohol, with water. Especially preferred in some cases are mixtures of ethanol and water wherein the ethanol constitutes at least 50% of the volume or weight of the ethanol-water mixture. A greater percentage of ethanol, up to 95 or 98%, is often more preferable. These solvent combinations are often preferred as they are relatively environmentally friendly as compared to other solvents. Other solvent combinations useful for this disclosure can be taken from U.S. Pat. No. 4,990,252. The solvent and solvent combinations described in the above mentioned reference are included as embodiments of this disclosure. The solvents used for dissolving ionomers may also be used to dissolve the ionomer with other components. Examples of other solvent components that may be used are formic acid, tetrahydrofuran (THF), acetonitrile (ACN), acetone, 2-methoxy and ethoxy ethylene glycols.

Small amounts of solvents which may dissolve the support (such as, DMF, NMP, and others) in high concentrations may be added in low concentrations to the other solvents of the coating formulation to enhance solubility of the coating polymers as needed and to modify the final film morphology.

6. Preferred (but not limiting) solvent combinations are based on formic acid and/or lower molecular weight alcohols. Depending on the polymers, a typical combination is of formic acid with 5 to 20% alcohols such as ethanol, or other solvents such as acetonitrile or acetone or water. Other solvent combinations are 60/40 ethanol/water, up to 95/5 ethanol/water. Typical polymer concentration in the solvent depends on the mode of application to the support. In the pressure or vacuum mode of application, concentration is less than 1% and closer to 0.1% or 0.05%. For the other modes of coating described above the polymer concentrations may be low, in the range of 0.05 to 0.1 to 0.2%, and go as high as 10% to 15%, but generally between 0.01 to 5%. Other solvent combinations are acetone/water (such as, 75%/25% ratio), and acetonitrile/water (such as, 95%/5% ratio), and other aqueous mixtures with tetrahydrofuran (THF), acetonitrile (ACN), acetone, 2-methoxy and ethoxy ethylene glycols, and others. As already described, a useful solvent for sulfonated polymers, alone or in combination with other polymers is the solvent formic acid at a concentration ranging from 5% to 100% formic acid, with other solvents or flux enhancing additives. Other solvents together with formic acid are ethanol, acetonitrile formamide and formamide-containing mixtures such as formamide/2-methoxyethanol and formamide/formic acid. Acetone and acetonitrile can be used with other mixtures as, for example, mixtures of acetonitrile/water and acetone/water. Aprotic solvents such as NMP or DMF may be added in amounts which do not damage the underlying support or surface.

7. In order to facilitate the coating process, the polymer solutions that are used to coat the supports may include other components, such as surfactants to help wet the support if necessary, and agents which prevent collapse of the UF support during the curing and/or drying step of the process. One preferred agent is glycerol. Typical concentrations of glycerol in the coating formulation may vary from 1 to 40% and in one preferred embodiment between 2 to 10%. Other hydrophilic polyhydroxy compounds may also be used.

8. In one embodiment, the curing and/or heating step of the deposited membrane is an important component of the disclosed membranes. Different curing times and temperatures will give different membrane performance. In addition, depending on the chemistry involved in the crosslinking step, different curing temperatures are needed. There is also a time temperature superposition principle. In effect the higher temperatures need shorter times. Long times at lower temperatures may be used in addition to a first curing at higher temperatures. Typical curing temperatures may vary from 60° C. to 130° C. and curing times at elevated temperatures from 5 to 120 minutes.

9. A preferred mode of coating the solution of components making up in part the selective barrier is by applying a thin layer onto the dense surface of the asymmetric UF support. Coating solutions from 0.05 to 0.1 to 10% polymer (or total polymers) can be applied onto porous supports (such as tight upper surface of an asymmetric UF support) by methods such as gravure, dip, reverse roll, gap, metering, extrusion, curtain, or air knife coating, followed by solvent evaporation. Another preferred mode of application is by pressure of up to 20 bars (a typical pressure applied is from 1 to 15 bars, and in one embodiments form 4 to 10 bars) or by the application of a vacuum. The vacuum may be applied by a water aspirator, oil vacuum pump or diaphragm vacuum pump. The amount of solvent collected in the permeate during concentration by pressure or vacuum application on the polymer solution used will determine the extent of material collected on the surface of the membrane. The density of the film applied to the surface may depend on the magnitude of pressure or vacuum applied. In many applications thin dense films are preferred over open thick films. Also the application of pressure can affect the morphology of the final film. When using this approach of pressure or vacuum, diluted polymer coating solutions (such as, 0.001 to 1%, preferably 0.01 to 0.5%) are used. One of the benefits of working with diluted solutions is the possibility of using polymers that will not dissolve in solvents at higher concentrations and the use of polymer mixtures such as ionic polymers of opposite charge in forming amphoteric and mosaic structures without precipitation. Another benefit is the economic use of expensive components of the selective barrier. When applied in very diluted solutions they are more cost effective. Diluted coating solutions in the range of 0.05% to 0.5% polymer solid contents may also be used in other methods of coating, such as gravure, dip, reverse roll, gap, metering, curtain, or air knife coating with the same benefits of using diluted solutions as described for vacuum and pressure coating methods.

10. In addition to forming single layers of the selective barrier on the support, this disclosure also includes multilayer formation. One layer is first laid down, and then one or more additional layers may be deposited. The layers may be made of the same composition or different compositions and may be deposited or coated by the same or different methods. They also may be coated from similar solvent combinations, concentrations and/or pH or different solvents concentrations and/or pH. In addition, before applying each layer the prior layer may or may not be crosslinked or cured. In one preferred embodiment, the second layer is deposited using solvents and/or conditions which do not dissolve or modify the first layer. For example, a solvent which does not dissolve the first layer is used for the composition of the second layer, or/and the first layer has been stabilized by crosslinking prior to adding the second layer, whose composition contains solvents which would normally dissolve the first layer, or the method of application is under pressure or vacuum such that the first layer is held in place by the vacuum or pressure so it is not dissolve by the solvent of the second layer. The multiple-coating approach may be used for various reasons. In one scenario, an additional layer is applied to repair imperfections and to plug holes. In a second scenario, of layers of different ionic sign are applied in order to achieve alternating layers of positive and negative charge and thus change the selectivity of the selective film. In another scenario, an additional layer may be added during the coating process to improve rejection or as an anti fouling layer, or additional coating without polymers may be applied to change the reaction conditions (pH, residual solvent, counter ions of the ionic groups) of the first layer prior to a subsequent curing (crosslinking) step, and/or morphological change of the coating prior to curing (crosslinking)

11. In all of the cases of applying the thin film mentioned above a minimal amount of penetration of the polymer components into the pore is often preferred, so as to achieve a high flux. There may be, however, some penetration for stabilizing the structures, and in some cases this penetration may affect final membrane selectivity. Optionally, the composite may contain an intermediate layer between the top ionic (such as, sulfonated) selective film and the porous support, or the selective layer sandwiched between two different layers or a combination of both and multiple layers of the aforementioned combination or other combinations. In one method of preparation of the disclosed composite, the support is impregnated with a pore protector prior to coating with the polymer to prevent excessive penetration of the coating polymer into the support. Depending on the pore protector, it may be removed after the coating is in place or it may be permanently fixed in the pores if it does not reduce the overall flux to unacceptable low levels as per the application. Another preferred method of preparation may use no pore protector, and a combination of support pore size, polymer molecular weight and the method of application are used to control the degree of pore penetration. For adhesion and fixing of the coating on to the support some penetration of the polymeric coating into the upper pores of the support may be desirable. In one preferred embodiment of this disclosure, the coating may be covalently chemically bonded to the support, as in the case of using diazonium reactions to affect the crosslinking. To improve adhesion to the support the coating solution may contain non-solvents that swell (but not excessively) the support, such as formic acid or small amounts (to the extent that they do not damage the support) of solvents such as DMF or NMP or DMSO or toluene. The amounts of such solvents in the coating solution may be typically in the range of 0.5 to 10%.

The polymers which may be used for making the UF support are especially those made from condensation polymerization and/or engineering plastics with a combination of acid/base resistance and oxidant resistance and in some cases solvent stability. Typical polymers of which the UF support may be made are given in patent application WO 2007135689. Included in this list are solvent resistant membranes derived from polyacrylonitrile (as for example in U.S. Pat. No. 5,039,421) which have been modified chemically to give solvent resistant UF membranes, and crosslinked polysulfone (U.S. Pat. No. 5,028,337 and others).

Methods of making UF membranes and UF membranes as supports for composites are well known in the art and are included within this disclosure. The UF support of this disclosure is a porous support formed from organic polymers by any of the well known state of art processes. The casting solutions may then be cast on a support material such as glass, metal, paper or plastic, from which it may be removed. It is preferred for many applications, however, to cast the solution onto a porous support material from which the membrane is not removed. Such porous support materials may be woven or nonwoven textile materials such as those made from cellulosic, polyethylene, polypropylene, nylon, vinyl chloride homopolymers and copolymers, polystyrene, polyesters such as polyethylene terephthalate, polyvinylidene fluoride, polytetrafluoroethylene, polyether-ketones, glass fibers, porous ceramics and inorganics. The UF support may be also cast on expanded polyolefin microporous membrane.

The disclosed membranes may be made by forming the selective layer on different support configurations such as flat, capillary, tublets or hollow fiber configuration, and then used as is or be configured into configurations such as a plate and frame, spiral wound, tubular or hollow fiber elements. In another embodiment of the disclosure, the coating may be applied to the support inside a finished plate and frame, spiral wound, tubular or hollow fiber element. Those skilled in the art are aware of the many methods for forming a porous substrate into different configurations. For example, hollow fiber or capillary membrane configurations, made for example from polysulfones, polyether sulfones, polyether ketones, polyvinylidene fluoride, sulfonated polyvinylidene fluoride. Alternatively, a hollow support tube of polyester or polyolefin or many other polymers of about 0.5 to 2 cm in diameter may be used to form tubular membranes. All the above methods may be used to form membranes for further modification (coating) as described by the present disclosure. Membranes as capillary, and hollow fiber configurations generally are self supporting and generally do not have be woven or non-woven textile materials or polymeric supports as is common for flat, spiral and tubular UF and microporous membranes.

Microporous supports can also be used in this disclosure. Polymeric or inorganic or ceramic microporous and UF membranes with pore size varying from 0.0.002 to 10 microns can be used in this disclosure. These supports may be made by a variety of techniques well known in the art, for example as described in U.S. Pat. No. 4,466,931, Ind. Eng., Prod. Res. Develop., Vol. 13, No. 1, 1974, U.S. Pat. Nos. 3,812,224 and 4,247,498. The materials commonly used for making microfilters are: polysulfones, polypropylene, polytetrafluoroethylene, alumina, silica, carbon, polyvinylidene fluoride, high and low density polyethylene, polypropylene, polystyrene, polyvinyl chloride and oxidation polymers such as polyphenyleneoxide.

Treatment of Support Prior to Coating

In one preferred embodiment, the UF support which is coated to form the composite is cleaned with a pretreatment step such as washing of the support with water or acid and/or basic pH streams and/or with surfactants, and then an optional final rinse prior to coating. Typically used surfactants are sodium dodecyl sulfonic acid or sodium lauryl sulfate or Triton X-100. Membrane cleaning may also include the use of solvents such as butyl alcohol/water mixtures. As mentioned above, in some embodiments the porous support may contain groups which enhance the adsorption or stability of the coating polymer to the support. The porous support may optionally be treated with a pore protector which minimizes excessive penetration of the coating polymer into the support which could reduce the final flux of the composite membrane to unacceptable low values for a given application. The pore protector may be washed out after the composite is formed or it may be kept in place if the flux of the final combination is high enough for the application. Examples of pore protectors are hydrophilic polymers, water soluble or water swellable, and thermal gels such as gelatin which may be applied in the sol state and then gelled and removed by heating and washing out under pressure. In one preferred embodiment, the polymeric UF membrane is made with additives added to the casting solution of the UF support to enhance the adhesion of the ionomer to the UF support. Such additives may be organic or inorganic. If the coating is an ionic polymer or ionomer such as, by way of example, perfluorinated ionomer or a sulfonated engineering polymer such as polysulfone, polyethersulfone, polyphenylsulfones, polyphenylene sulfones, polyetheretherketone, polyetherketone or mixtures of such polymers, the additive will have some attraction to the ionic groups. In one preferred embodiment, the additives are zirconium oxide, aluminum oxide and similar inorganics which are known to have interaction with anionic groups such as sulfonic groups. Polymeric additives such as polyvinylpyrolidinone (PVP), which complex with anionic polymers may also be used as additives in the preparation of the UF support. Alternatively, after the UF support is formed it may be subjected to reactions well known in the art which introduce groups which would enhance the adsorption of the ionomer unto the UF support. Such groups are amino groups or cationic groups, such as quaternary ammonium or sulfoniums or phosphonium groups.

Compatibilizers may also be employed in producing composite membranes of the present disclosure. As used herein, "compatibilizers" refer to agents that aid in the blendability of two or more polymers that would otherwise be resistant to such blending. Examples include block copolymers containing connecting segments of each polymer component. These include both potential substrate and/or ion-conducting polymer components.

Pore size considerations: In supports, as for example asymmetric UF supports, all pore sizes can be modified but there is an optimum pore size and pore density that will give the optimum performance of the final composite after the UF support is coated and cured or otherwise treated. The optimum relationship between the support characteristics and the final composite performance can be determined readily by trial and error. Typically for making NF and RO composites the UF support may have a molecular weight cutoff from 1K to 100K and in many cases between 5K to 30K.

The post treatments described in U.S. Pat. No. 4,990,252 may be used as needed as an optional refinement to achieve a required performance. In effect optional post treatments consisting of organic solvents and aqueous mixtures with or without thermal treatments can be given to the finished composite membrane for the purpose of improving permeability through swelling and/or hydration of the thin film. The post treatment may alternatively include further stabilization or "tightening" of the thin film polymer through ionic crosslinking or salt formation using solutions of multivalent metal salts, or through basic nitrogen containing compounds. Thermal treatments in aqueous media may be applied for the purpose of reordering the permselective barrier and thus further affecting membrane transport behavior. Post-treatment may also entail keeping the membranes, after preparation in a relatively dry state for a number of days before immersion into water.

Many commercial UF membranes may also be used, such as UF membranes supplied by Micro Dyne Nadir (Hoechst), Osmonics, Hydranautics, Dow and many other companies.

In general, the method of converting engineering polymer into ionomers by, for example sulfonation, is well known and described in the references given above. A non-limiting example: Polyphenylsulfone (Solvay Radel R 5900 or Aldrich-Sigma catalog no. 42, 831-0) is sulfonated by drying a given amount (grams) overnight at 100° C., and then cooled and dissolved in chloroform. After the solution is cooled to −10° C., chlorosulfonic acid is added and the solution is stirred under $N_2$ at 0 to 4° C. for 60 minutes. The solution is then precipitated in an ethanol/water solution, washed with DI water and an equivalent amount of lithium hydroxide is added to obtained the Li salt of the sulfonated polyphenylsulfone. Finally, the solution is dried in a vacuum oven overnight.

Example of the preparation of Sulfonated Polyetheretherketone (PEEK-$SO_3H$): A series of solutions is made by adding 30 g of polyetheretherketone (PEEK, available from Hoechst AG, Frankfurt, Germany) and 400 mL of concentrated sulfuric acid (100-102%) to 500 mL Telflon-sealed glass bottles. The bottles are sealed and shaken at room temperature on a mechanical shaker for various times between 10 and 190 hours, with the degree of sulfonation increasing with time. The resulting viscous red solutions are then poured into 4 L of a stirred mixture of ice and water. The precipitates are collected, crushed into fine powder and washed with water until the washings is pH-neutral. The white polymer powders are then dried in vacuum (0.1 ton) at 40° C. for 24 h. The solubility in alcohol and hot water increases with an increasing degree of sulfonation. Water absorption capacity of these membranes ranges from 5% to 40% to 500%, increasing with the degree of sulfonation.

In the following examples one mode of characterizing the membranes is as follows. The separation effect (rejection) of the membranes can be measured as follows. A circular membrane with a surface area of 13 $cm^2$, resting on a sintered stainless steel disc, is used in a cylindrical cell made of stainless steel. 150 ml of the solution which contains the solute to be tested in a concentration $C^1$ (g. solute/g. solution) are introduced onto the membrane in the steel cylinder and subjected to a pressure ($N_2$) of 5 to 30 bars. The solution is stirred magnetically. The concentration ($C^2$) of the liquid which collects on the outlet side of the membrane is determined by using 3 samples of 5 ml, each being taken after passage of at least 25 ml from the beginning of the experiment. The rejection (R) can be calculated from the values obtained using the following equation.

$$R(\%)=[(C^1-C^2/C^1]\times 100$$

The amount of material (F=flux) passing through the membrane per surface and time unit is determined from the equation $$F=[V]\times S^{-1}\times t^{-1}$$

where V=volume, S=membrane surface area and t=time. F may be expressed in terms of liters of solution per square meter surface area of membrane per hour per bar (Lp). In addition to measurements on flat membranes in the above pressure cells, flat membranes were also tested in flow cells. Modified Capillaries are checked as capillaries in a small element of known active area. Tubular membranes 60 cm long and with an outer diameter of 1.4 cm were also checked. For this purpose the tubular membranes were placed in a perforated tube made of stainless steel. The whole is then placed in a tube made of polycarbonate. The outflow from the membrane is between this outer polycarbonate tube and the steel tube. The liquid is added as a stream of solution in turbulent or laminar flow under pressure through the lumen of the tube. The flow rate is kept constant at 10-15 liters per minute. The rejection (R) and the flux (F) are calculated in a similar manner as above.

By way of example, the membranes were checked in the above configurations at 15-30 atm with the following solutes: sucrose (5%), 20 mM NaCl, 8 mM CaCl2 and 8 mM sodium sulfate and different mixtures of these solutes.

EXAMPLES

In the following examples various membranes and/or films were tested for oxidant and/or chlorination resistance. The tests examined the ability of the tested membrane to maintain its flux and rejection properties after exposure to 500 ppm NaOCl pH 9 for a certain period of time. The properties of the membrane which were measured are water flux (measured in liters/$m^2$/hr-bar), % rejection to sucrose and % rejection to 1000 ppm NaCl.

In some cases the tests included placing self-standing films prepared from the same composition as the thin layers that were placed on the UF supports and undergone similar crosslinking procedures, in a solvent which is considered a strong solvent for the polymers, such as N-methylpyrrolidinone (NMP), and observing whether they are dissolved or swelled, and the extent of the swelling, if occurred.

The NF membranes prepared as described in the examples below comprise a UF support coated on its dense smaller pore upper surface by a polymer layer. In some of the examples the support was a flat sheet asymmetric UF from Hoechst Microdyn Nadir RM UPO10 P 1060 and the 005K Microdyn Nadir and GE-Osmonic's P-series PES ultrafiltration membrane with a MWCO of 10,000 Dalton.

Three different procedures were used for the coating:

1) Immersion coating. The UF membrane was immersed in the polymer solution, withdrawn from the solution, blotted on the bottom non-woven side and placed on a glass plate with the dense coated side of the UF facing up. The drying was carried out by blowing hot air over the surface.

2) Vacuum filtration. The polymer solution was filtered through the UF membrane by a vacuum applied on the porous side of the UF membrane by a piston vacuum pump.

3) Pressure filtration. The UF membrane was put into a pressure cell and the polymer solution was filtered through the UF membrane by applied pressure.

In the examples below the counter ions to the sulfonic groups are protons, and unless otherwise specified, Li may also be used (as well as other counter ions) and the optimum counter ion with respect to coating solution properties and final membrane performance can be chosen by experiments.

The temperature at which the aryl coupling via the diazonium formation of free radicals was carried out in the final examples is at 90° C. and for 1 hr. Crosslinking may also, however, be carried out over a range of temperatures from room temperature (RT) to above 100° C. At lower temperatures longer times may be optimally used while at higher temperatures shorter time should be used. The optimum temperatures with respect to membrane properties are readily optimized.

Example 1

The UF membranes used in this example were first washed overnight in deionized (DI) water with 0.5% SDS and then for 2-3 hrs in DI water before use.

A sample of polyphenylsulfone from Solvay (R5900NT) was nitrated and then sulfonated according to the above procedures to give a nitrated and sulfonated polyphenylsulfone (abbreviated as $SPPSNO_2$) with 1.4 meq/gr sulfonic groups and 0.65% nitrogen in the form of nitro groups. Part of this sample was reduced to amino groups to give polyphenylsulfone derivative with both amino and sulfonic groups (abbreviated as $SPPSNH_2$). Each of these polymers, the $SPPSNO_2$ and the SPPSNH$_2$, was dissolved in a solution of ethanol/water (80/20) with 1% NMP to form 1.5% and 0.5% solutions, respectively. Aliquots of 0.5 ml and 0.70 ml were taken from the solutions of the SPPSNO$_2$ and SPPSNH$_2$, respectively, and were added to a 25 ml solution of ethanol/water/glycerol (70/20/10), adjusted to a pH of 1 with concentrated sulfuric acid. The result was a solution wherein the ratio of SPPSNO$_2$/SPPSNH$_2$ is 60/40, and the concentration of the components is 0.05% and 0.025%, respectively. This solution was stirred and then applied to the surface of the PES Micro-Dyne Nadir UF support with a MWCO of about 10 k Daltons by vacuum filtration, forming a layer calculated to be about 200 nm dry thickness. A crosslinking step followed, in which the composite was first exposed to a solution containing 3% sodium nitrite and sulfuric acid at pH 1 for 15 min at 0 to 8° C. under vacuum. The solution was then poured out and a different solution, of 8% glycerol at pH 10, was added and kept on the surface of the membrane for 15 min under vacuum. Next, the remaining solution was poured out and the membrane was placed in an oven at 90° C. for 60 min. The membrane was removed and left at room temperature (RT) for 48 hours before testing. The resulting membrane had a water flux of 5 Lp (liters/m$^2$/hr-bar), 95% rejection to sucrose and 80% rejection to 1000 ppm NaCl. When placed in 500 ppm NaOCl pH 9 it remained stable and maintained its flux and rejection for at least 100,000 ppm hours.

When the above membrane was made with 4% rather than 8% glycerol in the pH 10 step, the resulting membrane had a water flux of 4 Lp (liters/m$^2$/hr-bar), 98% rejection to sucrose and 88% rejection to 1000 ppm NaCl. When placed in 500 ppm NaOCl pH 9 it maintained its flux and rejection in the same order of magnitude, for at least 100,000 ppm hours.

The above membranes were also placed in the following solutions to check resistance: pH 11-12 for 30 days at room temperature and pH 1-2 for 30 days at room temperature. The membranes remained stable under these conditions.

In addition to the preparation of a coating to a UF support as described above, the same combination of SPPSNO$_2$/SPPSNH$_2$ was also used for the preparation of self-standing films. The self standing films prepared from the above combination of SPPSNO$_2$/SPPSNH$_2$ were crosslinked by first placing them in a solution of 3% sodium nitrite and sulfuric acid at pH 1 for 60 min at 0 to 8° C., then adjusting the pH to pH 10, and then performing a heat curing under the same conditions as above. The self-standing films were not dissolved when placed in the strong solvent NMP.

Comparative Example 1a

A sulfonated polyphenyl sulfone polymer (SPPS) (sulfonic groups-1.4 meq/gr) without nitro groups, and aminated polyphenylsulfone (PPSNH$_2$)(0.65% N) without sulfonic groups were made as described in WO2007135689 patent application and its references. These polymers where used to make a NF membrane as described in Example 1 above. The resulting membrane had a water flux of 4 Lp (liters/m$^2$/hr-bar), 92% rejection to sucrose and 80% rejection to 1000 ppm NaCl. When placed in 500-1000 ppm NaOCl pH 9 the flux dropped sharply to unacceptably low levels over a period of 8 days.

Comparative Example 1b

When a commercial polyamide NF membrane, NF 90 form Dow Film-Tech, was placed in 500 ppm NaOCl pH 9 its flux dropped to less than a ¼ of its initial value after 48,000 ppm-hr.

Comparative Example 1e

A sulfonated polyphenyl sulfone polymer (SPPS) (sulfonic groups-1.6 meq/gr) without the nitro (—NO$_2$) groups, and an aminated polyphenylsulfone (PPSNH$_2$ 2.0% N) without sulfonic groups were made as described in WO2007135689 patent application and its references and tested the same way as above.

Its starting performance was significantly decreased after immersion in 500 ppm NaOCl pH 9. The flux had dropped to almost a ¼ of its initial value and the rejection dropped by 40% after 8 days.

Example 2

In this example polymers consisting of different ratios of sulfonic to primary aromatic amine than in Example 1 were used: SPPSNO$_2$/SPPNH$_2$ combination [1.14 IEC/1.4% N)]/[1.14 IEC/1.4% N]

As in Example 1, polyphenylsulfone from Solvay (R5900NT) was nitrated and sulfonated to give a nitrated and sulfonated polyphenylsulfone (SPPSNO$_2$) with 1.14 meq/gr sulfonic groups and 1.4% nitrogen in the form of nitro groups. Part of this sample was reduced to amino groups to give polyphenylsulfone derivative with both amino and sulfonic groups (SPPSNH$_2$). The UF membrane that was coated was a PES Hoechst Nadir UF support with a MWCO of 5K Dalton and the coating solutions contained SPPSNO$_2$/SPPSNH$_2$ in the ratio of 60/40. The coating solution in this case was 0.2% of the total polymer content in a formic acid/ethanol/glycerol solvent in a ratio of 90/10/5 with about 5% N,N' dimethylformamide (DMF). The UF membrane was immersed in the polymer solution for 1 minute, withdrawn from the solution, and excess solution on the bottom non-woven side of the membrane was removed by blotting this side on filter paper. The membranes is then placed on a glass plate with the upper coated side of the UF facing up and dried for 1 min with a hot air fan over the wet surface. For crosslinking, the membrane was then placed in 1.2% H$_2$SO4 with 3.3% NaNO$_2$ for 10 min at 0° C., pH 0.5 to 1. After 10 min it was removed, drained and placed in a solution with Glycerin 5% at pH 11.2 for 13 min at 0-25° C. It was then plotted blot on the backside and dried in an oven at 90° C. for 60 min. The membrane was removed and left at RT for 24 to 48 hours before testing. The resulting membrane had a water flux of 3.5 Lp (liters/m$^2$/hr-bar), 96% rejection to sucrose and 86% rejection to 1000 ppm NaCl. When placed in 500 ppm NaOCl pH 9 it maintained its flux and rejection above 90% for at least 50,000 ppm hours. Similar results could be achieved by using higher oven temperatures with shorter times.

When the ratio of SPPSNO$_2$/SPPSNH$_2$ was changed to 50/50, the resulting membrane had a water flux of 2.9 Lp (liters/m$^2$/hr-bar) and 99% rejection to sucrose and when placed in 500 ppm NaOCl pH 9 it maintained its flux and rejection above 95% for at least 100,000 ppm hours.

When the ratio of SPPSNO$_2$/SPPSNH$_2$ was changed to 70/30, the resulting membrane had a water flux of 4.8 Lp (liters/m$^2$/hr-bar) and 85% rejection to sucrose and when placed in 500 ppm NaOCl pH 9 it maintained its flux and rejection for at least 100,000 ppm hours.

As can be seen by this example, by changing the ratios of the polymer compositions resistant membranes can be made with different rejections and fluxes, which can be optimized for a given application. Other parameters, such as film thickness, concentration of amino versus ionic groups, coating solution properties and many other parameters and variables well known in the art, can be used to optimize flux, permeability and selectivity properties.

Example 3

Example 2 was repeated using a nitrated and sulfonated polyphenylsulfone (SPPSNO$_2$), with 1.6 meq/gr sulfonic groups and 0.6% nitrogen in the form of nitro groups. Polyphenylsulfone derivative with both amino and sulfonic groups (SPPSNH$_2$) were also used, with 1.14 meg/gr sulfonic and 1.46% nitrogen. The membrane was then made as the membrane in Example 2. The resulting membrane had a water flux of 2.5 Lp (liters/m$^2$/hr-bar), 98% rejection to sucrose and 90% rejection to 1000 ppm NaCl. When placed in 500 ppm NaOCl pH 9 it maintained its flux and high rejection for at least 100,000 ppm hours.

Examination of the interface between the thin crosslinked layer and the UF support by immersing the composite in the solvent NMP, which dissolves the polymer of the support, showed residual amounts of the support polymer attached to the crosslinked thin film, indicating that it was chemically attached to the UF support.

In addition to the preparation of a coating on a UF support as described above, the same combination of SPPSNO$_2$/SPPSNH$_2$ was also used for the preparation of self-standing films. The self standing films prepared from the above combination of SPPSNO$_2$/SPPSNH$_2$ were crosslinked by first placing them in a solution of 3% sodium nitrite and sulfuric acid at pH 1 for 60 min at 0 to 8° C., then adjusting the pH to pH 10, and then performing a heat curing under the same conditions as above. The self-standing films were not dissolved when placed in the strong solvent NMP. As a control, films of the same polymer composition that were treated in exactly the same way but without the use of sodium nitrite so that the diazonium crosslinking did not occur, dissolved readily in NMP.

Another piece of the film was first placed in 1000 ppm NaOCl at pH 9 for 2 weeks with changing the NaOCl every 2 days. The membrane was then placed in NMP and the film did not dissolve nor did it swell significantly.

Example 4

Example 2 was repeated using SSPSNH$_2$ polymers where the sulfonic groups were replaced by bromine groups (Br) groups to give BrPPSNH$_2$. The different polymers were SPPSNO$_2$ where the IEC of the sulfonic was 1.2 meq/g and the amount of nitro groups was 0.4% N, and BrPPNH$_2$ polymer where the amount of amino groups was 1.6% N and the amount of bromine group was 1.6% Br. A membrane was then made from these polymers as described for the membrane in Example 2. The resulting membrane had a water flux of 5 Lp (liters/m$^2$/hr-bar), 95% rejection to sucrose and 80% rejection to 1000 ppm NaCl. When placed in 500 ppm NaOCl pH 9 it maintained its flux and rejection for at least 100,000 ppm hours.

Self-standing films of the above combination were prepared as in Example 3, crosslinked via diazonium formation and then heat cured as in Example 3. The final film did not dissolve in the strong solvent NMP. Another piece of the film was first placed in 1000 ppm NaOCl at pH 9 for 2 weeks with changing the NaOCl every 2 days. The membrane was then placed in NMP and the film did not dissolve.

Example 5

A UF membrane was prepared by dissolving 20 grams of polyether sulfone 5003 from Imperial Chemical Industries (ICI) in 80 grams of a solvent combination composed of 60 grams N-Methylpyrrolidinone (NMP) and 20 grams of formamide. After stirring for 4 hours at 60° C. the solution was left to stand for overnight and then coated onto a polyolefin Awa non-woven Fabric to form a 200 micron wet film which was immediately immersed in ice water. After 1 hr in ice water it was removed and the remaining solvent was leached in running water for overnight at ambient conditions. After leaching for overnight in water at ambient conditions the UF support was coated as in Example 1, giving a membrane with similar properties: a water flux of 4.6 Lp (liters/m$^2$/hr-bar) and 97% rejection to sucrose. The Lp of the UF support was 37 Lp (liters/m$^2$/atm-hr). When placed in 500 ppm NaOCl pH 9 it maintained its flux and high rejection for at least 100,000 ppm hours.

Example 6 —Use of PEEK Polymers Instead of PPS

In this example polyetheretherketone (PEEK) was used instead of polyphenylsulfone (PPS). PEEK was purchased from Aldrich and sulfonated according to the procedure described in U.S. Pat. No. 6,090,895 and nitrated and reduced to form an amine by the procedure described in Modification of Condensation Polymers pp 16-17 by W. E. Daly, S. Lee and C. Rungaroonthaikul in Chemical reactions on Polymers, ACS symposium series 364 1986. In this way, PEEK derivatives with sulfonic and nitro groups were formed (SPEEKNO$_2$) having a —SO$_3$H content of 2.0 meq/g and —NO$_2$ of 1.2% N, and PEEK derivatives with sulfonic and amino groups (SPEEKNH$_2$) of 0.8 meq/gr —SO$_3$H and NH$_2$ of 3.2% N. These polymers were then used to form membranes as described in Example 2, and the resulting membrane had a water flux of 3 to 5 Lp (liters/m$^2$/hr-bar) and 95% rejection to sucrose. When placed in 500 ppm NaOCl pH 9 it maintained its flux and rejection for at least 190,000 ppm hours.

Example 7 —Use of Crosslinked UF Supports

Polysulfone 3500 from Solvay (PSU) was nitrated and reduced to the amino derivative by the procedure described in Modification of Condensation Polymers pp 16-17 by W. E. Daly, S. Lee and C. Rungaroonthaikul in Chemical reactions on Polymers, ACS symposium series 364 1986, to give a PSU polymer derivative with 1.8 meg/gr —NH$_2$ groups. The PSU and the amino-PSU polymer in a ratio of 60/40 were then dissolved in 80% NMP/20% formamide solution such that the total polymer content was 25%. After stirring for 4 hours at 60° C. the solution was left to stand for overnight and then coated onto a polyolefin Awa non-woven Fabric to form a 200 micron wet film, which was immediately immersed in ice water. After 1 hr in ice water it was removed and the remaining solvent was leached in running water for overnight at ambient conditions. The resultant UF membrane was then immersed in a solution of 3% of sodium nitrite and sulfuric acid at pH 1 for 60 min at 0 to 8° C. After this step, the UF membrane was removed, washed in ice water and placed in an aqueous solution of pH 10 with 5% glycerol for 10 minutes. It was then removed and heat cured at 90° C. for 60 min. When placed in the strong solvent NMP it did not dissolve.

Example 1 was then repeated with respect to the coating polymers and procedures using the above crosslinked UF membranes as a support for coating instead of the Hoechst NADIR membrane. The resulting membrane had a water flux of 3.3 Lp (liters/m$^2$/hr-bar) and a rejection of 80% to sucrose. In order to check the solvent resistance of the composite membrane, the membrane was immersed in a water/NMP (50/50) solution, removed, washed with water and tested again, giving a sucrose rejection of 82% and a water flux of 2.8 Lp. The membrane of Example 1 was destroyed when placed in NMP, as the UF support dissolved.

Example 8

This example relates to a modification of a NF membrane. A NF 90 membrane was immersed in the coating solution of Example 3, but with the pH of the solution being adjusted to pH 3 rather than pH 1 by using less sulfuric acid. After immersion for 20 minutes the membrane was removed, drained and placed in an oven at 60° C. for 30 minutes. Next, a crosslinking steps followed in which the membrane was first placed in a solution of 3% of sodium nitrite and sulfuric acid at pH 1 for 60 min at 0 to 8° C. It was then placed in a solution of pH 10 with 4% glycerol for 15 minutes, removed, drained and then placed in an oven at 60° C. for 30 minutes. The resulting membrane had an increased rejection to 1000 ppm NaCl, 97% rather then 85%, without a significant loss of flux.

Example 9

A polyphenylsulfone from Solvay (R5900NT) was hydroxylated according to the methods described in U.S. Pat. No. 4,797,457 with an —OH content of 1.6 meg/gr. This polymer was added to the mixture of $SPPSNO_2$/$SPPSNH_2$ to give a polymer mixture of $SPPSNO_2$/$SPPSNH_2$/PPSOH of 50/30/20, which had the same total amount of polymer in the coating solution as for the combination of only $SPPSNO_2$/$SPPSNH_2$ in Example 1. This polymer coating solution was then used as in Example 1 on the same UF support, and the resulting membrane had a water flux of 3.2 Lp (liters/m²/hr-bar), 98% rejection to sucrose and 85% rejection to 1000 ppm NaCl. When placed in 500 ppm NaOCl pH 9 it maintained its flux and rejection for at least 100,000 ppm hours. A self-standing film made from the same polymer combination as in Example 1 was highly crosslinked and did not dissolve in a strong solvent such as NMP.

Example 10

A commercial NF membrane, Dow Filmtech NF 270 was modified by the coating solutions and dip coating procedures of Example 2. The heat curing was 60° C. for 30 min. As a result of this process the resulting membrane had a significant increase in its salt rejection—its rejection to 1000 ppm NaCl increased from 50 to 80% rejection, without a significant loss of flux.

Example 11 —Comparative

In this example RO and NF membranes made of sulfonated polyethersulfone on polysulfone supports, for example as described in U.S. Pat. No. 4,990,252, were tested. These membranes where claimed to have good oxidant resistance, however, investigation of their resistance showed that under the conditions of 500 to 1000 ppm of NaOCl pH 9 the flux dropped sharply to unacceptably low levels over a period of 8 days at 20 to 25° C.

Example 12

Example 3 was repeated wherein the $SPPSNH_2$ is replaced by 1,1,1 tris(aminophenyl)ethane at a 5% concentration of the total amount of polymer in the coating solutions. The resulting membrane, when checked by the same method as in Example 3, had had a water flux of 3.5 Lp (liters/m²/hr-bar), 88% rejection to sucrose and 87% rejection to 1000 ppm NaCl. When placed in 500 ppm NaOCl pH 9 it maintained its flux and high rejection for at least 100,000 ppm hours.

What we claim is:

1. A membrane or film comprising a mixture of polymers, wherein the mixture comprises:
    an aromatic ionic polymer comprising an electron withdrawing group selected from the group consisting of a halide, a nitro, and a combination thereof, wherein the electron withdrawing group is present on at least a fraction of the aromatic sites; and
    an amino aromatic polymer comprising a functional group selected from the group consisting of a halide, a nitro, a sulfonic, a phosphonic, a carboxylic, and a combination thereof, wherein the functional group is present on at least a fraction of the aromatic sites;
    wherein the aromatic ionic polymer and the amino aromatic polymer are covalently crosslinked via reaction of amino groups to form a bond selected from the group consisting of aryl-aryl (—Ar—Ar—), aryl-ether-aryl (—Ar—O—Ar—), aryl-sulfide-aryl (—Ar—S—Ar—), aryl-sulfone-aryl, and a combination thereof.

2. The membrane or film according to claim 1, wherein the amino aromatic polymer comprises a halide.

3. The membrane or film according to claim 1, wherein the halide is selected from the group consisting of F, Cl, and Br.

4. The membrane or film according to claim 1, wherein the aromatic ionic polymer and/or the amino aromatic polymer comprise an aromatic condensation polymer selected from the group consisting of polysulfone (PSU), polyphenylsulfone (PPS), polyphenylene sulfone, polyethersulfone (PES), polyetherketone (PEK), polyether ether ketone (PEEK), polyether ketone ether ketone, a combination of polyether ketone and polysulfone, polyphenylene sulfide, phenylene sulfone, a combination of sulfide and sulfone, poly ether based on polyphenylene oxide, 2,6 -dimethyl phenylene, a derivative thereof, and a combination thereof 5. The membrane or film according to claim 1, wherein the aromatic ionic polymer is nitrated sulfonated polyphenylsulfone ($SPPSNO_2$), and wherein the amino aromatic polymer is aminated sulfonated polyphenylsulfone ($SPPSNH_2$).

6. The membrane or film according to claim 5, wherein the nitrated sulfonated polyphenylsulfone ($SPPSNO_2$)comprises a nitro content in the range of 0.2- 1.8% N w/w, and sulfonic groups in the range of 0.5 to 2.0 meq/gr.

7. The membrane or film according to claim 1, wherein the amino aromatic polymer is halo (halogen) aminated polyphenylsulfone (halo$PPSNH_2$).

8. The membrane or film according to claim 1, wherein the aromatic ionic polymer, the amino aromatic polymer, or both comprise hydroxylated aromatic condensation polymers.

9. The membrane or film according to claim 1, wherein the aromatic ionic polymer is selected from the group consisting of nitrated sulfonated polyetheretherketone ($SPEEKNO_2$), polyetherketoneetherketone ($SPEKEKNO_2$), and a combination thereof; and wherein the amino aromatic polymer is selected from the group consisting of aminated sulfonated polyetheretherketone ($SPEEKNH_2$), polyetherketoneetherketone ($SPEKEKNH_2$), and a combination thereof.

10. The membrane or film according to claim 1, wherein the membrane is selected from the group consisting of composite nanofiltration (NF), reverse osmosis (RO) and ultrafiltration (UF) membrane.

11. The membrane or film according to claim 1, wherein the film is adapted for use as a part of a composite membrane, as a part of a crosslinked asymmetric membrane, as a self standing membrane, or as a membrane coating layer.

12. The membrane of film according to claim 1, configured to retain an initial flux and rejection in alkaline halogen oxidizing solutions for at least 8 days.

13. A process for the preparation of a membrane or film comprising:
    covalently crosslinking:
        an aromatic ionic polymer comprising an electron withdrawing group selected from the group consisting of a halide, a nitro, and a combination thereof, wherein the electron withdrawing group is present on at least a fraction of the aromatic sites; and
        an amino aromatic polymer comprising a functional group selected from the group consisting of a halide, a nitro, a sulfonic, a phosphonic, a carboxylic, and a combination thereof; wherein the functional group is present on at least a fraction of the aromatic sites;
    wherein the crosslinking via reaction of amino groups reduces the amino group concentration and forms a bond selected from the group consisting of aryl-aryl (—Ar—Ar), aryl-ether-aryl (—Ar—O—Ar—), aryl-sulfide-aryl (—Ar—S—Ar—), aryl-sulfone-aryl, and a combination thereof.

14. The process according to claim 13, wherein the covalent crosslinking is formed through diazonium reaction of the amino groups.

15. The process according to claim 13, further comprising crosslinking through the amino groups an amino containing component selected from the group consisting of an organic compound, a monomer, and an oligomer; wherein the amino containing component comprises at least two aromatic groups each comprising a primary amine with a molecular weight of less than 2000 Daltons.

16. The process according to claim 13, wherein the amino aromatic polymer comprises a halide.

17. The process according to claim 13, wherein the aromatic ionic polymer and/or the amino aromatic polymer comprise an aromatic condensation polymer selected from the group consisting of polysulfone (PSU), polyphenylsulfone (PPS), polyphenylene sulfone, polyethersulfone (PES), polyetherketone (PEK), polyether ether ketone (PEEK), polyether ketone ether ketone, a combination of polyether ketone and polysulfone, polyphenylene sulfide, phenylene sulfone, a combination of sulfide and sulfone, poly ether based on polyphenylene oxide, 2,6-dimethyl phenylene, a derivative thereof, and a combination thereof.

18. The process according to claim 17, wherein the aromatic ionic polymer is nitrated sulfonated polyphenylsulfone (SPPSNO$_2$), and wherein the amino aromatic polymer is aminated sulfonated polyphenylsulfone (SPPSNH$_2$).

19. The process according to claim 18, wherein the aminated sulfonated polyphenylsulfone (SPPSNH$_2$) comprises a sulfonic content in the range of 0.1-1.8 meq/gr and an amino content, prior to crosslinking, in the range of 0.5 to 3.6% elemental nitrogen.

20. The process according to claim 18, wherein the aminated sulfonated polyphenylsulfone (SPPSNH$_2$) comprises a sulfonic content in the range of 0.2 to 1.0 meq/gr, and an amino content, prior to crosslinking, in the range of 0.5 to 2.0% elemental nitrogen.

* * * * *